United States Patent
Saitoh et al.

(10) Patent No.: US 12,283,788 B2
(45) Date of Patent: Apr. 22, 2025

(54) LASER OSCILLATION ELEMENT

(71) Applicant: FUJIFILM Corporation, Tokyo (JP)

(72) Inventors: Yukito Saitoh, Minamiashigara (JP); Katsumi Sasata, Minamiashigara (JP); Makoto Shimizu, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 635 days.

(21) Appl. No.: 17/584,110

(22) Filed: Jan. 25, 2022

(65) Prior Publication Data

US 2022/0145183 A1 May 12, 2022

Related U.S. Application Data

(63) Continuation of application No. PCT/JP2020/028452, filed on Jul. 22, 2020.

(30) Foreign Application Priority Data

Jul. 26, 2019 (JP) .................................. 2019-137791

(51) Int. Cl.
 *H01S 3/20* (2006.01)
 *H01S 3/14* (2006.01)
 (Continued)

(52) U.S. Cl.
 CPC .............. *H01S 3/1686* (2013.01); *H01S 3/14* (2013.01); *H01S 3/20* (2013.01); *H01S 3/213* (2013.01);
 (Continued)

(58) Field of Classification Search
 CPC . H01S 3/1686; H01S 3/14; H01S 3/20; H01S 3/213; H01S 3/094076; H01S 3/169
 See application file for complete search history.

(56) References Cited

U.S. PATENT DOCUMENTS 11,332,671 B2 * 5/2022 Kodama .............. C09K 19/588
2002/0003827 A1 * 1/2002 Genack .................... H01S 5/10
372/51

(Continued)

FOREIGN PATENT DOCUMENTS

| JP | 2005-116980 A | 4/2005 |
| JP | 2007-19447 A | 1/2007 |
| JP | 2008-270358 A | 11/2008 |
| WO | WO 2019/013292 A1 | 1/2019 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/028452, dated Feb. 10, 2022, with an English translation.

(Continued)

*Primary Examiner* — Kinam Park

(74) *Attorney, Agent, or Firm* — Birch, Stewart, Kolasch & Birch, LLP

(57) ABSTRACT

Provided is a laser oscillation element including a cholesteric liquid crystal layer, in which even in a case where the intensity of excitation light is weak, laser oscillation can be induced. The laser oscillation element includes a cholesteric liquid crystal layer obtained by cholesteric alignment of a liquid crystal compound, in which in a cross-section of the cholesteric liquid crystal layer observed with a scanning electron microscope, bright portions and dark portions derived from the cholesteric liquid crystalline phase are tilted with respect to a main surface of the cholesteric liquid crystal layer, the cholesteric liquid crystal layer includes a colorant that emits light by excitation, and a luminescence wavelength range of the colorant and a selective reflection wavelength range of the cholesteric liquid crystal layer at least partially overlap each other.

7 Claims, 10 Drawing Sheets

(51) Int. Cl.
*H01S 3/16* (2006.01)
*H01S 3/213* (2006.01)
*C09K 11/06* (2006.01)
*C09K 19/38* (2006.01)
*C09K 19/60* (2006.01)
*H01S 3/094* (2006.01)

(52) U.S. Cl.
CPC .......... *C09K 11/06* (2013.01); *C09K 19/3852* (2013.01); *C09K 19/60* (2013.01); *H01S 3/094076* (2013.01); *H01S 3/169* (2013.01)

(56) References Cited

U.S. PATENT DOCUMENTS

| | | | |
|---|---|---|---|
| 2002/0018171 A1* | 2/2002 | Asao | C09K 19/34 |
| | | | 349/172 |
| 2007/0165687 A1* | 7/2007 | Takezoe | H01S 3/08059 |
| | | | 372/51 |
| 2016/0342003 A1* | 11/2016 | Takeda | C09K 19/2007 |
| 2017/0373459 A1* | 12/2017 | Weng | G02B 27/4261 |
| 2020/0110202 A1* | 4/2020 | Kodama | C09K 19/2007 |
| 2020/0326579 A1* | 10/2020 | Sato | G02F 1/13473 |
| 2022/0099872 A1* | 3/2022 | Sasata | G02B 5/1833 |

OTHER PUBLICATIONS

International Search Report (Form PCT/ISA/210) for International Application No. PCT/JP2020/028452, dated Oct. 13, 2020, with an English translation.

* cited by examiner

LASER OSCILLATION ELEMENT

CROSS-REFERENCE TO RELATED APPLICATIONS

This application is a Continuation of PCT International Application No. PCT/JP2020/028452 filed on Jul. 22, 2020, which claims priority under 35 U.S.C. § 119(a) to Japanese Patent Application No. 2019-137791 filed on Jul. 26, 2019. The above application is hereby expressly incorporated by reference, in its entirety, into the present application.

BACKGROUND OF THE INVENTION

1. Field of the Invention

The present invention relates to a laser oscillation element.

2. Description of the Related Art

The use of a cholesteric liquid crystal layer in which a colorant is dispersed as a laser oscillation element is disclosed.

The cholesteric liquid crystal layer has a characteristic of in which light having a specific selective reflection wavelength is reflected depending on a helical structure of a cholesteric liquid crystalline phase. The laser oscillation element including the cholesteric liquid crystal layer has a configuration where the cholesteric liquid crystal layer includes a colorant.

In this laser oscillation element, the colorant in the cholesteric liquid crystal layer emits light by irradiation with excitation light. The light emitted from the colorant is repeatedly reflected in the cholesteric liquid crystal layer, and the emission of the colorant is also induced by the reflected light. Therefore, in a case where the irradiation with excitation light is continued, the emitted light is amplified to oscillate as laser light.

This laser oscillation element can cause laser oscillation to occur in a selective reflection wavelength range of the cholesteric liquid crystal layer.

For example, JP2005-116980A describes a laser oscillation element including a polymer cholesteric liquid crystal film that includes a colorant and a liquid crystal, in which the colorant emits fluorescence by light excitation, the liquid crystal includes a polymer cholesteric liquid crystal, a difference Δn between a refractive index ne of the liquid crystal in a major axis direction and a refractive index no of the liquid crystal in a minor axis direction is 0.15 to 0.45, an emission band of fluorescence emitted from the colorant and a selective reflection wavelength range of the polymer cholesteric liquid crystal film at least partially overlap each other, a helical axis of the liquid crystal in the polymer cholesteric liquid crystal film is parallel to a thickness direction of the polymer cholesteric liquid crystal film, and helical alignment of the liquid crystal in the polymer cholesteric liquid crystal film is immobilized.

SUMMARY OF THE INVENTION

In the laser oscillation element including the cholesteric liquid crystal layer, in order to induce laser oscillation from the emission of the colorant, it is necessary to confine the emitted light in the element using a reflective structure. However, in a case where the cholesteric liquid crystal layer is thin, the reflection in the cholesteric liquid crystal layer is weak such that is difficult to confine the light. Therefore, it is difficult to induce laser oscillation. Therefore, the intensity of excitation light for inducing laser oscillation needs to be increased.

An object of the present invention is to solve the above-described problem of the related art and to provide a laser oscillation element including a cholesteric liquid crystal layer, in which even in a case where the intensity of excitation light is weak, laser oscillation can be induced.

In order to achieve the object, the present invention has the following configurations.

[1] A laser oscillation element comprising:
a cholesteric liquid crystal layer obtained by cholesteric alignment of a liquid crystal compound,
in which in a cross-section of the cholesteric liquid crystal layer observed with a scanning electron microscope, bright portions and dark portions derived from the cholesteric liquid crystalline phase are tilted with respect to a main surface of the cholesteric liquid crystal layer,
the cholesteric liquid crystal layer includes a colorant that emits light by excitation, and
a luminescence wavelength range of the colorant and a selective reflection wavelength range of the cholesteric liquid crystal layer at least partially overlap each other.

[2] The laser oscillation element according to [1],
in which the luminescence wavelength range of the colorant and at least one of band edge wavelengths of the selective reflection wavelength range of the cholesteric liquid crystal layer overlap each other.

[3] The laser oscillation element according to [1] or [2],
in which a tilt angle of the bright portions and the dark portions with respect to the main surface of the cholesteric liquid crystal layer is 40° to 90°.

[4] The laser oscillation element according to any one of [1] to [3],
in which the colorant is an organic colorant.

[5] The laser oscillation element according to any one of [1] to [4],
in which the liquid crystal compound in the cholesteric liquid crystal layer is tilted with respect to the main surface of the cholesteric liquid crystal layer.

According to the present invention, it is possible to provide a laser oscillation element including a cholesteric liquid crystal layer, in which even in a case where the intensity of excitation light is weak, laser oscillation can be induced.

DESCRIPTION OF THE PREFERRED EMBODIMENTS

Hereinafter, a laser oscillation element according to an embodiment of the present invention will be described in detail based on preferable embodiments shown in the accompanying drawings.

In the present invention, numerical ranges represented by "to" include numerical values before and after "to" as lower limit values and upper limit values.

In this present invention, "(meth)acrylate" represents "either or both of acrylate and methacrylate".

[Laser Oscillation Element]

The laser oscillation element according to the embodiment of the present invention comprises:

a cholesteric liquid crystal layer obtained by cholesteric alignment of a liquid crystal compound, in which in a cross-section of the cholesteric liquid crystal layer observed with a scanning electron microscope, bright portions and dark portions derived from the cholesteric liquid crystalline phase are tilted with respect to a main surface of the cholesteric liquid crystal layer, the cholesteric liquid crystal layer includes a colorant that emits light by excitation, and a luminescence wavelength range of the colorant and a selective reflection wavelength range of the cholesteric liquid crystal layer at least partially overlap each other.

Figure 1:
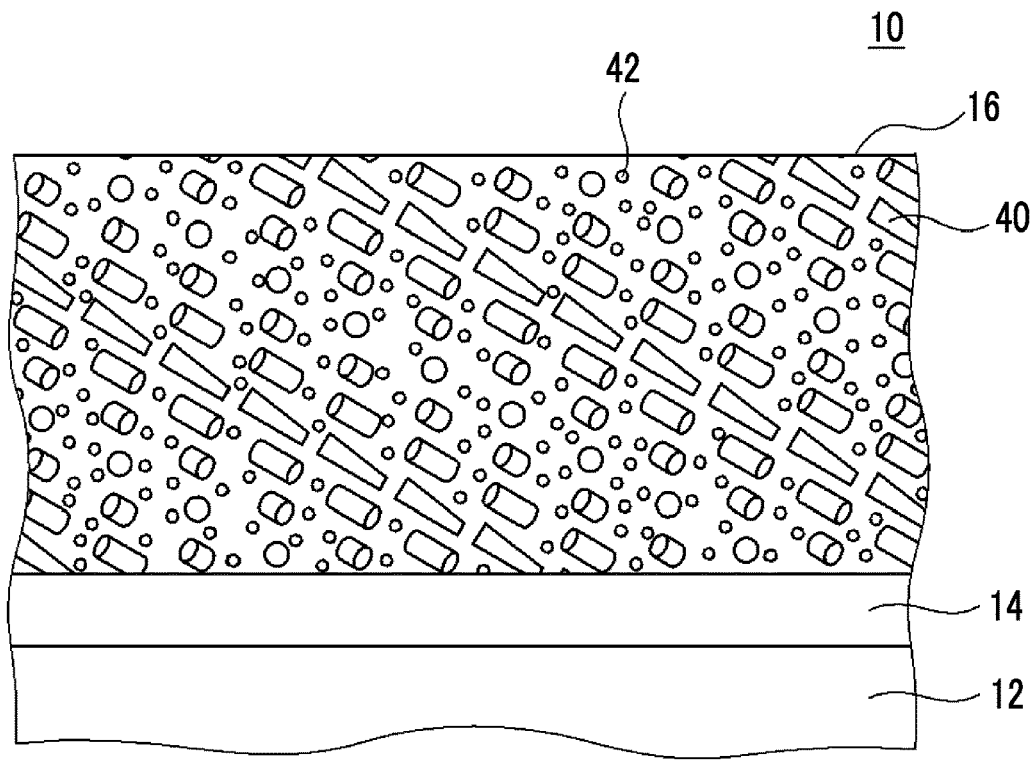
FIG. 1 is a diagram conceptually showing an example of a laser oscillation element according to the present invention.

FIG. 1 is a diagram conceptually showing an example of the laser oscillation element according to the embodiment of the present invention.

A laser oscillation element 10 shown in FIG. 1 includes a support 12, an alignment film 14, and a cholesteric liquid crystal layer 16.

The cholesteric liquid crystal layer 16 is obtained by cholesteric alignment of a liquid crystal compound.

In addition, in a cross-section (hereinafter, also referred to as "cross-sectional SEM image") of the cholesteric liquid crystal layer 16 observed with a scanning electron microscope (SEM), bright portions and dark portions derived from a cholesteric liquid crystalline phase are tilted with respect to a main surface (refer to FIG. 3). The main surface is the maximum surface of a sheet-shaped material (for example, a film or a plate-shaped material).

Figure 2:
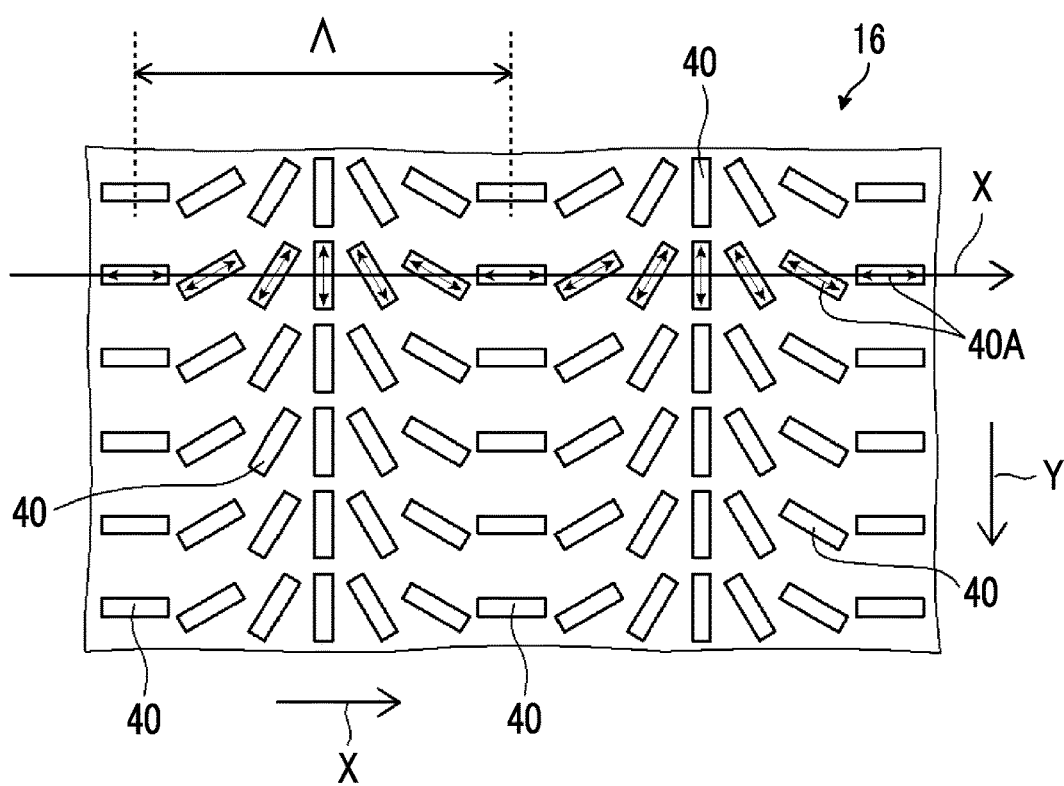
FIG. 2 is a schematic plan view showing a cholesteric liquid crystal layer in the laser oscillation element shown in FIG. 1.

In the cholesteric liquid crystal layer 16, in order to adopt a configuration where bright portions and dark portions are tilted with respect to a main surface, the cholesteric liquid crystal layer 16 has a liquid crystal alignment pattern in which a direction of an optical axis 40A derived from a liquid crystal compound 40 changes while continuously rotating in at least one in-plane direction (refer to FIG. 2).

Further, as shown in FIG. 1, the cholesteric liquid crystal layer 16 includes a colorant 42 that emits light by light excitation.

The laser oscillation element 10 according to the embodiment of the present invention has the above-described configuration such that laser oscillation can be induced by excitation light having a high intensity. This point will be described below.

[Support]

In the laser oscillation element 10, the support 12 supports the alignment film 14 and the cholesteric liquid crystal layer 16.

As the support 12, various sheet-shaped materials can be used as long as they can support the alignment film 14 and the cholesteric liquid crystal layer 16.

A transmittance of the support 12 with respect to corresponding light is preferably 50% or higher, more preferably 70% or higher, and still more preferably 85% or higher.

The corresponding light is predetermined circularly polarized light in a predetermined wavelength range (selective reflection wavelength range) that is selectively reflected by the cholesteric liquid crystal layer 16. In this case, the predetermined wavelength range includes a variation caused by wavelength shortening in the corresponding wavelength range due to oblique incidence, so-called blue shift (short-wavelength shift).

The thickness of the support 12 is not particularly limited and may be appropriately set depending on the use of the laser oscillation element 10, flexibility or rigidity required for the laser oscillation element 10, a difference in thickness required for the laser oscillation element 10, a material for forming the support 12, and the like in a range where the alignment film 14 and the cholesteric liquid crystal layer 16 can be supported.

The thickness of the support 12 is preferably 1 to 1000 µm, more preferably 3 to 250 µm, and still more preferably 5 to 150 µm.

The support 12 may have a monolayer structure or a multi-layer structure.

In a case where the support 12 has a monolayer structure, examples thereof include supports formed of a resin material such as glass, triacetyl cellulose (TAC), polyethylene terephthalate (PET), polycarbonates, polyvinyl chloride, acryl, or polyolefin. In a case where the support 12 has a multi-layer structure, examples thereof include a support including: one of the above-described supports having a monolayer structure that is provided as a substrate; and another layer that is provided on a surface of the substrate.

<Alignment Film>

In the laser oscillation element 10 shown in FIG. 1, the alignment film 14 is formed on a surface of the support 12.

The alignment film 14 is an alignment film for aligning the liquid crystal compound 40 to a predetermined liquid crystal alignment pattern during the formation of the cholesteric liquid crystal layer 16.

Although described below, in the present invention, the cholesteric liquid crystal layer 16 has a liquid crystal alignment pattern in which a direction of an optical axis 40A (refer to FIG. 2) derived from the liquid crystal compound 40 changes while continuously rotating in one in-plane direction. Accordingly, the alignment film 14 is formed such that the cholesteric liquid crystal layer 16 can form the liquid crystal alignment pattern.

In the following description, "the direction of the optical axis 40A rotates" will also be simply referred to as "the optical axis 40A rotates".

As the alignment film 14, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 14 formed by a rubbing treatment can be formed by rubbing a surface of a polymer layer with paper or fabric in a given direction multiple times.

As the material used for the alignment film 14, for example, a material for forming polyimide, polyvinyl alcohol, a polymer having a polymerizable group described in JP1997-152509A (JP-H9-152509A), or an alignment film 14 such as JP2005-97377A, JP2005-99228A, and JP2005-128503A is preferable.

In the present invention, for example, the alignment film 14 can be suitably used as a so-called photo-alignment film obtained by irradiating a photo-alignment material with polarized light or non-polarized light. That is, in the present invention, a photo-alignment film that is formed by applying a photo-alignment material to the support 12 is suitably used as the alignment film 14.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 14 is not particularly limited. The thickness with which a required alignment function can be obtained may be appropriately set depending on the material for forming the alignment film 14. The thickness of the alignment film 14 is preferably 0.01 to 5 μm and more preferably 0.05 to 2 μm.

A method of forming the alignment film 14 is not limited. Any one of various well-known methods corresponding to a material for forming the alignment film 14 can be used. For example, a method including: applying the alignment film 14 to a surface of the support 12; drying the applied alignment film 14; and exposing the alignment film 14 to laser light to form an alignment pattern can be used.

Figure 9:
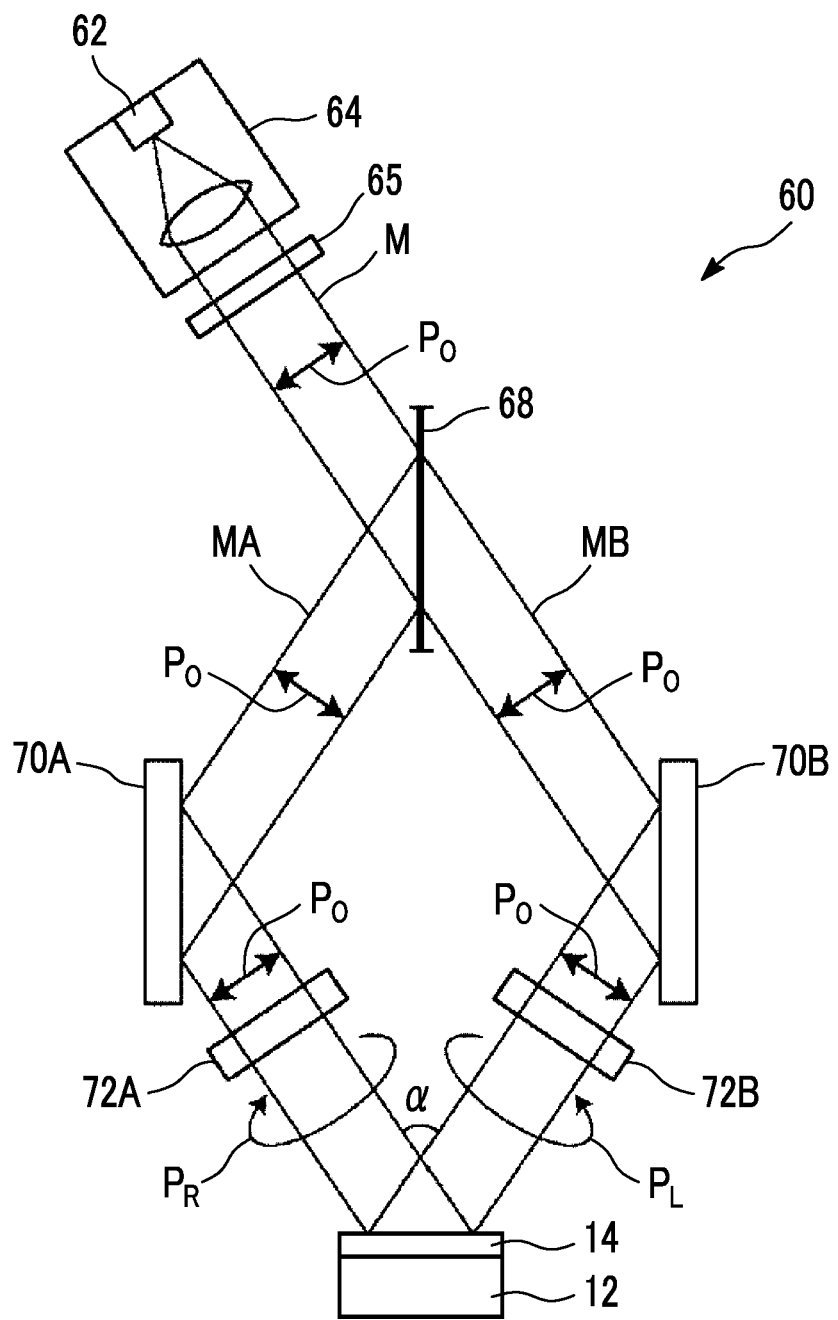
FIG. 9 is a conceptual diagram showing an example of an exposure device that exposes an alignment film.

FIG. 9 conceptually shows an example of an exposure device that exposes the alignment film 14 to form an alignment pattern (refer to FIG. 2).

An exposure device 60 shown in FIG. 9 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_O$. The λ/4 plates 72A and 72B have optical axes parallel to each other. The λ/4 plate 72A converts the linearly polarized light $P_O$ (beam MA) into right circularly polarized light $P_R$, and the λ/4 plate 72B converts the linearly polarized light $P_O$ (beam MB) into left circularly polarized light $P_L$.

The support 12 including the alignment film 14 on which the alignment pattern is not yet formed is disposed at an exposed portion, the two beams MA and MB intersect and interfere each other on the alignment film 14, and the alignment film 14 is irradiated with and exposed to the interference light. Due to the interference at this time, the polarization state of light with which the alignment film 14 is irradiated periodically changes according to interference fringes. As a result, an alignment film (hereinafter, also referred to as "patterned alignment film 14") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted. Specifically, the single period Λ can be adjusted in an arrow X direction shown in FIG. 2 below.

By forming the cholesteric liquid crystal layer on the alignment film 14 having the alignment pattern in which the alignment state periodically changes, as described below, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

In the laser oscillation element according to the embodiment of the present invention, the alignment film 14 is provided as a preferable aspect and is not an essential component.

For example, the following configuration can also be adopted, in which, by forming the alignment pattern on the support 12 using a method of rubbing the support 12, a method of processing the support 12 with laser light or the like, or the like, the cholesteric liquid crystal layer or the like has the liquid crystal alignment pattern in which the direction of the optical axis 40A derived from the liquid crystal compound 40 changes while continuously rotating in at least one in-plane direction. That is, in the present invention, the support 12 may be made to function as the alignment film.

<Cholesteric Liquid Crystal Layer>

In the laser oscillation element 10, the cholesteric liquid crystal layer 16 is formed on a surface of the alignment film 14.

The cholesteric liquid crystal layer 16 is obtained by cholesteric alignment of a liquid crystal compound, and includes the colorant 42. That is, the cholesteric liquid crystal layer 16 is a layer formed of the liquid crystal compound 40 (liquid crystal material) having a cholesteric structure and the colorant 42.

The cholesteric liquid crystal layer has a helical structure in which the liquid crystal compound 40 is helically turned and laminated obtained by immobilizing a typical cholesteric liquid crystalline phase. In the helical structure, a configuration in which the liquid crystal compound 40 is helically turned once (rotated by 360°) and laminated is set as one helical pitch, and plural pitches of the helically turned liquid crystal compound 40 are laminated.

In other words, one helical pitch refers to the length of one helical winding, that is, the length in a helical axis direction in which a director (in a rod-shaped liquid crystal, a major axis direction) of the liquid crystal compound constituting the cholesteric liquid crystalline phase rotates by 360°.

Figure 3:
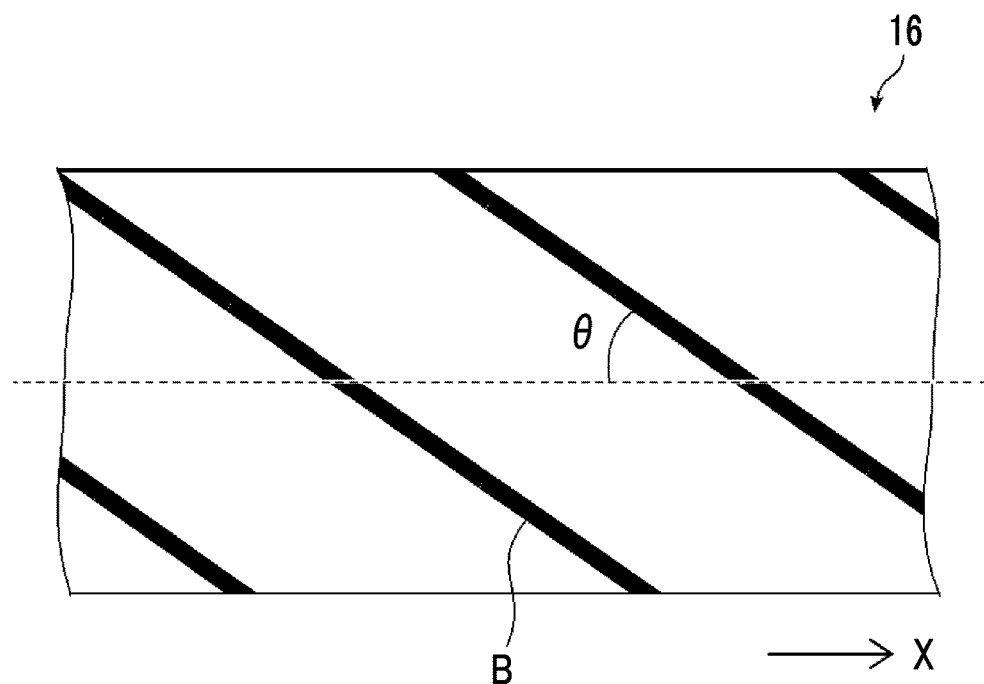
FIG. 3 is a diagram conceptually showing a cross-sectional SEM image of the cholesteric liquid crystal layer in the laser oscillation element shown in FIG. 1.

Here, as conceptually shown in FIG. 3, in a cross-section of the cholesteric liquid crystal layer observed with a SEM, a stripe pattern including bright portions (bright lines) and dark portions (dark lines) derived from the cholesteric liquid crystalline phase is observed. That is, in the cross-section of the cholesteric liquid crystal layer, a layered structure in which the bright portions and the dark portions are alternately laminated is observed.

In a typical cholesteric liquid crystal layer, the bright portions and the dark portions are parallel to the main surface and are alternately laminated in the thickness direction. On the other hand, in the cholesteric liquid crystal layer 16 according to the embodiment of the present invention, as shown in FIG. 3, the bright portions and the dark portions are tilted with respect to the main surface.

In the cholesteric liquid crystalline phase, a structure in which the bright portion and the dark portion are repeated twice corresponds to one helical pitch. That is, the structure in which the bright portion and the dark portion are repeated twice includes three dark portions and two bright portions. Alternatively, the structure in which the bright portion and the dark portion are repeated twice includes three bright portions and two dark portions. Therefore, the cholesteric liquid crystal layer, that is, the length (pitch P) of one helical pitch can be measured from a cross-sectional SEM image.

<<Cholesteric Liquid Crystalline Phase>>

It is known that the cholesteric liquid crystalline phase exhibits selective reflectivity at a specific wavelength.

A center wavelength λ of selective reflection (selective reflection center wavelength λ) λ of a general cholesteric liquid crystalline phase depends on the pitch P as the length of one helical pitch in the cholesteric liquid crystalline phase and satisfies a relationship of λ=n×P with an average refractive index n of the cholesteric liquid crystalline phase. Therefore, the selective reflection center wavelength can be adjusted by adjusting the pitch P.

The selective reflection center wavelength of the cholesteric liquid crystalline phase increases as the pitch P increases.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection wavelength range (circularly polarized light reflection wavelength range) where selective reflection is exhibited depends on Δn of the cholesteric liquid crystalline phase and the helical pitch P and satisfies a relationship of Δλ=Δn×P. Therefore, the width of the selective reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the use of the optical laminate. The half-width of the reflection wavelength range may be, for example, 10 to 500 nm and is preferably 20 to 300 nm and more preferably 30 to 100 nm.

<<Liquid Crystal Alignment Pattern of Cholesteric Liquid Crystal Layer>>

The cholesteric liquid crystal layer 16 according to the embodiment of the present invention has the liquid crystal alignment pattern in which the direction of the optical axis 40A (refer to FIG. 2) derived from the liquid crystal compound 40 forming the cholesteric liquid crystalline phase changes while continuously rotating in the one in-plane direction of the cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-shaped liquid crystal compound, the optical axis 40A is along a rod-shaped major axis direction. In the following description, the optical axis 40A derived from the liquid crystal compound 40 will also be referred to as "the optical axis 40A of the liquid crystal compound 40" or "the optical axis 40A".

FIG. 2 conceptually shows a plan view of the cholesteric liquid crystal layer 16.

The plan view is a view in a case where the cholesteric liquid crystal layer 16 (laser oscillation element 10) is seen from the top in FIG. 1, that is, a view in a case where the laser oscillation element 10 is seen from a thickness direction (laminating direction of the respective layers (films)).

In addition, in FIG. 2, in order to clarify the liquid crystal alignment pattern of the cholesteric liquid crystal layer 16, only the liquid crystal compound 40 on the surface of the alignment film 14 is shown. The surface of the alignment film 14 is a contact portion between the cholesteric liquid crystal layer 16 and the alignment film 14.

As shown in FIG. 2, on the surface of the alignment film 14, the liquid crystal compound 40 forming the cholesteric liquid crystal layer 16 is two-dimensionally arranged according to the alignment pattern formed on the alignment film 14 as the lower layer in a predetermined in-plane direction indicated by arrow X and a direction perpendicular to the one in-plane direction (arrow X direction).

In the following description, the direction perpendicular to the arrow X direction will be referred to as "Y direction" for convenience of description. That is, in FIGS. 1 and 3 and FIG. 5 described below, the Y direction is a direction perpendicular to the paper plane.

In addition, on the surface of the alignment film 14, the liquid crystal compound 40 forming the cholesteric liquid crystal layer 16 has the liquid crystal alignment pattern in which the direction of the optical axis 40A changes while continuously rotating in the arrow X direction in a plane of the cholesteric liquid crystal layer 16. In the example shown in the drawing, the liquid crystal compound 40 has the liquid crystal alignment pattern in which the optical axis 40A of the liquid crystal compound 40 changes while continuously rotating counterclockwise in the arrow X direction.

Specifically, "the direction of the optical axis 40A of the liquid crystal compound 40 changes while continuously rotating in the arrow X direction (the predetermined one in-plane direction)" represents that an angle between the optical axis 40A of the liquid crystal compound 40, which is arranged in the arrow X direction, and the arrow X direction varies depending on positions in the arrow X direction, and the angle between the optical axis 40A and the arrow X direction sequentially changes from θ to θ+180° or θ−180° in the arrow X direction.

A difference between the angles of the optical axes 40A of the liquid crystal compound 40 adjacent to each other in the arrow X direction is preferably 45° or less, more preferably 15° or less, and still more preferably less than 15°.

On the other hand, on the surface of the alignment film 14, in the liquid crystal compound 40 forming the cholesteric liquid crystal layer 16, the directions of the optical axes 40A are the same in the Y direction perpendicular to the arrow X direction, that is, the Y direction perpendicular to the one in-plane direction in which the optical axis 40A continuously rotates.

In other words, in the liquid crystal compound 40 forming the cholesteric liquid crystal layer 16, angles between the optical axes 40A of the liquid crystal compound 40 and the arrow X direction are the same in the Y direction.

In the present invention, in the liquid crystal alignment pattern of the liquid crystal compound 40, the length (distance) over which the optical axis 40A of the liquid crystal compound 40 rotates by 180° in the arrow X direction in which the optical axis 40A changes while continuously rotating in a plane is the length Λ of the single period in the liquid crystal alignment pattern. That is, a distance between centers of two liquid crystal compounds 40 in the arrow X direction is the length Λ of the single period, the two liquid crystal compounds having the same angle in the arrow X direction.

Specifically, as shown in FIG. 2, a distance of centers in the arrow X direction of two liquid crystal compounds 40 in which the arrow X direction and the direction of the optical axis 40A match each other is the length Λ of the single period. In the following description, the length Λ of the single period will also be referred to as "single period Λ".

In the laser oscillation element 10 according to the embodiment of the present invention, in the liquid crystal alignment pattern of the cholesteric liquid crystal layer, on the surface of the alignment film 14, the single period Λ is repeated in the arrow X direction, that is, in the one in-plane direction in which the direction of the optical axis 40A changes while continuously rotating.

<<Properties of Cholesteric Liquid Crystal Layer>>

A typical cholesteric liquid crystal layer not having the liquid crystal alignment pattern in a plane reflects incident circularly polarized light by specular reflection.

On the other hand, the cholesteric liquid crystal layer that has the liquid crystal alignment pattern in which the optical axis 40A changes while continuously rotating in the arrow X direction in a plane (the surface of the alignment film) reflects incident circularly polarized light in the arrow X direction or in a tilted direction opposite to the arrow X direction with respect to specular reflection.

Hereinafter, this action will be described by using a cholesteric liquid crystal layer that selectively reflects left circularly polarized light as an example.

In a case where left circularly polarized light incident into the cholesteric liquid crystal layer having the liquid crystal alignment pattern in which the optical axis 40A changes while continuously rotating in the arrow X direction is reflected from the cholesteric liquid crystal layer, the absolute phase changes depending on the directions of the optical axes 40A of the respective liquid crystal compound 40.

Here, in the cholesteric liquid crystal layer, the optical axis 40A of the liquid crystal compound 40 changes while rotating in the arrow X direction (the one in-plane direction). Therefore, the amount of change in the absolute phase of the incident left circularly polarized light varies depending on the direction of the optical axis 40A.

Further, the liquid crystal alignment pattern formed in the cholesteric liquid crystal layer is a pattern that is periodic in the arrow X direction. Therefore, an absolute phase that is periodic in a direction opposite to the arrow X direction corresponding to the direction of the optical axis 40A is assigned to the left circularly polarized light incident into the cholesteric liquid crystal layer.

In addition, the direction of the optical axis 40A of the liquid crystal compound 40 with respect to the arrow X direction is uniform in the arrangement of the liquid crystal compound 40 in the Y direction perpendicular to arrow X direction.

As a result, in the cholesteric liquid crystal layer having the liquid crystal alignment pattern in which the optical axis 40A changes while continuously rotating in the arrow X direction, an equiphase surface that is tilted to rise in the arrow X direction with respect to an XY plane is formed for the left circularly polarized light. The equiphase surface is formed to connect the liquid crystal compounds 40 that are helically turned and in which the directions of the optical axes 40A match with each other in the turning direction.

In the cholesteric liquid crystal layer, the equiphase surface functions as a reflecting surface. Therefore, in the cholesteric liquid crystal layer that reflects left circularly polarized light in which the optical axis 40A of the liquid crystal compound 40 rotates counterclockwise in the arrow X direction, incident left circularly polarized light is reflected in a tilted direction opposite to the arrow X direction with respect to specular reflection.

As described above, in a cross-section of the cholesteric liquid crystalline phase observed with a SEM, a stripe pattern including bright portions and dark portions derived from the cholesteric liquid crystalline phase is observed.

The bright portions and the dark portions of the cholesteric liquid crystalline phase are formed to connect the liquid crystal compounds 40 that are helically turned and in which the directions of the optical axes 40A match with each other in the turning direction. That is, the bright portions and the dark portions match with the above-described equiphase surface.

Accordingly, in the cholesteric liquid crystal layer, incident specific circularly polarized light is reflected from the bright portions and the dark portions as a reflecting surface by specular reflection.

Here, bright portions and dark portions of a typical cholesteric liquid crystal layer are parallel to the main surface, that is, the surface of the alignment film that is the formation surface.

On the other hand, the cholesteric liquid crystal layer 16 according to the embodiment of the present invention has the liquid crystal alignment pattern in which the optical axis 40A changes while continuously rotating in the arrow X direction on the surface of the alignment film 14.

As described above, the cholesteric liquid crystal layer 16 is formed on the alignment film 14 having an alignment pattern in which the alignment state periodically changes, the alignment pattern being capable of forming the liquid crystal alignment pattern. In the cholesteric liquid crystal layer 16, the arrangement of the liquid crystal compound 40 on the surface of the alignment film 14 is determined depending on the periodic structure of the single period Λ in the alignment pattern in which the alignment film 14 is formed.

On the other hand, in the cholesteric liquid crystal layer 16, a structure in which the liquid crystal compound 40 is helically twisted is formed such that one helical pitch (pitch P) has a length corresponding to the addition amount of the chiral agent described below in the thickness direction.

That is, in the cholesteric liquid crystal layer 16 according to the embodiment of the present invention, a periodic structure corresponding to both of a period in which the liquid crystal compound 40 is helically twisted in the thickness direction and a rotation period on the surface of the alignment film 14 is formed.

Therefore, in the cholesteric liquid crystal layer 16 having the liquid crystal alignment pattern in which the optical axis of the liquid crystal compound continuously rotates in the one in-plane direction, in order to obtain a good balance between the periodic structure in the plane direction and the periodic structure in the thickness direction, as shown in FIG. 1, the most thermally stable state is formed by tilting the liquid crystal compound 40 and tilting the arrangement of the liquid crystal compound.

In addition, as a result, as conceptually shown in FIG. 3, in the cholesteric liquid crystal layer 16, the bright portions and the dark portions derived from the cholesteric liquid crystalline phase are tilted with respect to the main surface.

<<Colorant>>

The cholesteric liquid crystal layer 16 includes the colorant 42 that emits light by light excitation.

The colorant 42 is not particularly limited as long as it emits light by light excitation, and well-known organic colorants and inorganic colorants can be used.

Examples of the organic colorant include a merocyanine colorant, a perylene colorant, a cyanine colorant, a pyran colorant, an anthracene colorant, a styryl colorant, a xanthene colorant, an oxazine colorant, a coumarin colorant, a stilbene colorant, an oxazole colorant, an oxadiazole colorant, a p-oligophenylene colorant, and a colorant represented by a chemical structural formula (R=EtH and R'=t-Bu) described in Journal of Chemical Society, 2002, Vol. 124, p. 9670.

Examples of the inorganic colorant include zinc sulfide, zinc silicate, cadmium zinc sulfide, calcium sulfide, strontium sulfide, calcium tungstate, uranium glass, platinum cyanide, a sulfide of an alkali earth metal, and a rare earth compound. In addition, as the inorganic colorant, a light emitting material of a so-called quantum dot can be used. Examples where the quantum dot is used for laser emission by light excitation include S. G. Lukishova et al, "Resonance in quantum dot fluorescence in a photonic bandgap liquid crystal host", 37, OPTICS LETTERS (2012) 125.

As the colorant 42, the organic colorant is preferable. In the case of the organic colorant, the colorant can be dissolved in a solvent and is advantageous in that it can be uniformly mixed in cholesteric liquid crystal at a high concentration.

In addition, in a case where the colorant 42 is dissolved in the liquid crystal, the transition moment is aligned in a given direction such that the absorption efficiency with respect to incidence light from a specific direction, and thus there is an advantageous effect in that the high-efficiency fluorescence emission can be obtained. As a result, laser oscillation at a band edge can be more suitably induced. This point will be described below.

Here, in the present invention, the luminescence wavelength of the colorant 42 and the selective reflection wavelength range of the cholesteric liquid crystal layer 16 at least partially overlap each other. This point will be described using FIG. 4.

Figure 4:
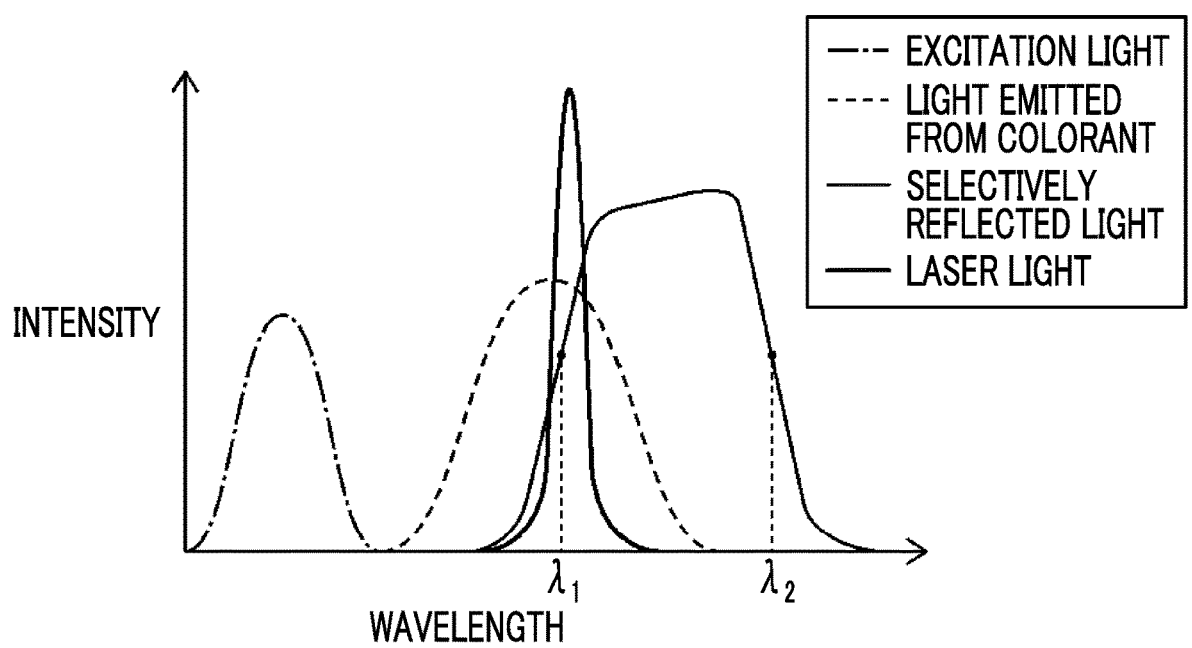
FIG. 4 is a graph showing an action of the laser oscillation element shown in FIG. 1.

FIG. 4 is a graph schematically showing a relationship between a wavelength and an intensity of each of excitation light that excites the colorant 42, light emitted from the colorant 42, selectively reflected light by the cholesteric liquid crystal layer 16, and oscillated laser light in the laser oscillation element 10 according to the embodiment of the present invention. In FIG. 4, the excitation light is indicated by a chain line, the light emitted from the colorant is indicated by a broken line, the selectively reflected light of the cholesteric liquid crystal layer is indicated by a solid line, and the oscillated laser light is indicated by a thick line.

As shown in FIG. 4, the colorant 42 emits light (the broken line in FIG. 4) in a wavelength range on longer wavelength side in the example shown in FIG. 4, the light being different from the excitation light (the chain line in FIG. 4) that is irradiated. The wavelength range of the light emitted from the colorant 42 and the selective reflection wavelength range (the solid line in FIG. 4) of the cholesteric liquid crystal layer 16 at least partially overlap each other. In the laser oscillation element 10 according to the embodiment of the present invention, at an wavelength in the wavelength range where the luminescence wavelength range of the colorant 42 and the selective reflection wavelength range of the cholesteric liquid crystal layer 16 overlap each other, laser light (the thick line in FIG. 4) is oscillated.

Here, as described above, in the case of the laser oscillation element where the colorant is dispersed in the cholesteric liquid crystal layer where the bright portions and the dark portions observed in the cross-sectional SEM image are parallel to the main surface of the cholesteric liquid crystal layer, in a case where the cholesteric liquid crystal layer is thin, it is difficult to confine reflected light in the cholesteric liquid crystal layer, and thus it is difficult to induce laser oscillation. Therefore, the intensity of excitation light for inducing laser oscillation needs to be increased.

Figure 5:
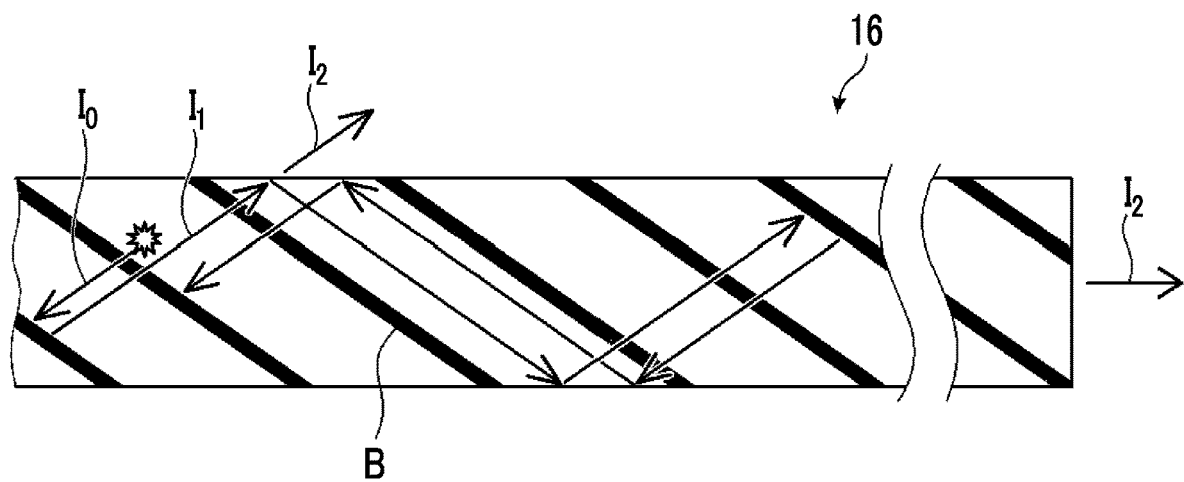
FIG. 5 is a conceptual diagram showing the action of the laser oscillation element shown in FIG. 1.

On the other hand, in the laser oscillation element 10 according to the embodiment of the present invention, the bright portions and the dark portions observed from the cross-sectional SEM image are tilted with respect to the main surface of the cholesteric liquid crystal layer. Therefore, as shown in FIG. 5, light $I_0$ emitted from the colorant 42 by irradiation with excitation light is reflected by the helical structure of the cholesteric liquid crystalline phase in the cholesteric liquid crystal layer 16. In this case, the light $I_0$ is reflected in a direction perpendicular to the bright portions and dark portions (light $I_1$). This light $I_1$ travels obliquely to the surface (interface) direction of the cholesteric liquid crystal layer 16. Therefore, the optical path length is longer as compared to light that travels vertically, and the light confinement effect is high. Further, light is incident from a direction oblique to the surface (interface) of the cholesteric liquid crystal layer 16. Therefore, the reflectivity of the light $I_1$ from the surface is high. In particular, at an angle more than the total reflection angle, the light $I_1$ is completely reflected. The reflected light $I_1$ arrives at the opposite surface and is reflected again. Further, the reflected light $I_1$ is reflected by the helical structure of the cholesteric liquid crystalline phase. The light emitted from the colorant 42 by irradiation with excitation light undergoes reflection by the helical structure of the cholesteric liquid crystalline phase where the optical path length extends in the direction oblique to the surface and reflection from the surface of the cholesteric liquid crystal layer. As a result, it is presumed that the light is oscillated such that the intensity increases and laser light $I_2$ is emitted.

In order to easily understand the action of reflection in the cholesteric liquid crystal layer 16, FIG. 5 shows an interface between the bright portions and the dark portions as a reflecting surface.

However, the action of reflection of the predetermined specific circularly polarized light in the specific wavelength range in the cholesteric liquid crystal layer 16 is basically the same as that of a well-known cholesteric liquid crystal layer.

This way, in the configuration of the laser oscillation element 10 according to the embodiment of the present invention where the bright portions and the dark portions observed from the cross-sectional SEM image are tilted with respect to the main surface of the cholesteric liquid crystal layer, the light emitted from the colorant 42 by irradiation with excitation light is reflected in the oblique direction such that the reflection by the helical structure of the cholesteric liquid crystalline phase and the reflection from the surface of the cholesteric liquid crystal layer can be repeated a larger number of times. That is, in the laser oscillation element 10 according to the embodiment of the present invention, the light confinement effect of the cholesteric liquid crystal layer 16 is high. Therefore, even in a case where the intensity of the excitation light is weak, the light can be oscillated.

In addition, in the laser oscillation element 10 according to the embodiment of the present invention, the light confinement effect of the cholesteric liquid crystal layer 16 is high. Therefore, even in a case where the thickness of the cholesteric liquid crystal layer is small, laser oscillation can be induced with weak excitation light.

As shown in FIG. 5, in the laser oscillation element 10 according to the embodiment of the present invention, the oscillated laser light is emitted in the direction perpendicular to the bright portions and the dark portions. Therefore, the light is emitted in the direction oblique to the surface of the cholesteric liquid crystal layer.

Alternatively, as shown on the right side in FIG. 5, the laser light $I_2$ is emitted from a side surface of the cholesteric liquid crystal layer depending on the tilt angle of the bright portions and the dark portions.

Here, for example, from the viewpoints of increasing the optical path length due to the helical structure where the optical path length extends in the direction oblique to the surface and increasing the reflectivity from the surface of the cholesteric liquid crystal layer, the tilt angle θ of the bright portions and the dark portions with respect to the main surface of the cholesteric liquid crystal layer is preferably 10° to 90°, more preferably 30° to 90°, and still more preferably 40° to 90°.

In the cholesteric liquid crystal layer 16 according to the embodiment of the present invention, the angle θ between the bright portions and the dark portions and the main surface of the cholesteric liquid crystal layer 16 is an angle between the main surface of the cholesteric liquid crystal layer 16 and bright portions and dark portions in a region of 50% in the thickness direction with respect to the center in the thickness direction.

The tilt angle of the bright portions and the dark portions is measured from the angle of the bright portions and the dark portions observed from the cross-sectional SEM image.

Basically, the angle θ between the bright portions and the dark portions and the main surface of the cholesteric liquid crystal layer 16 is determined depending on the single period Λ (the length of the single period Λ) in the liquid crystal alignment pattern and the pitch P as the length of one helical pitch in the cholesteric liquid crystalline phase.

Specifically, as the single period Λ decreases, the angle θ increases. In addition, as the pitch P increases, the angle θ increases. Accordingly, basically, by adjusting the single period Λ and the pitch P, the angle θ can be set to any angle.

The pitch P in the cholesteric liquid crystal layer 16 may be appropriately set depending on the desired oscillation wavelength of light diffracted by the cholesteric liquid crystal layer 16, that is, the laser oscillation element 10.

In addition, the single period Λ in the liquid crystal alignment pattern is not particularly limited and may be set depending on the pitch P of the cholesteric liquid crystal layer 16, the tilt angle θ of the bright portions and the dark portions, and the like. The single period Λ in the liquid crystal alignment pattern is preferably 2 μm or less, more preferably 1 μm or less, and still more preferably 0.5 μm or less.

In consideration of the difficulty of the formation of the liquid crystal alignment pattern and the like, the single period Λ in the liquid crystal alignment pattern is preferably 0.1 μm or more.

In addition, the thickness of the cholesteric liquid crystal layer is not particularly limited. For example, from the viewpoints of a reduction in the thickness of the laser oscillation element, manufacturing suitability, and easiness of laser oscillation, the thickness of the cholesteric liquid crystal layer is preferably 1 μm to 20 μm, more preferably 1 μm to 10 μm, and still more preferably 1 μm to 5 μm.

In addition, the luminescence wavelength of the colorant 42 and the selective reflection wavelength range of the cholesteric liquid crystal layer 16 may at least partially overlap each other. From the viewpoint of suitably inducing laser oscillation, it is preferable that the luminescence wavelength of the colorant 42 overlaps with at least one of band short wavelengths of the selective reflection wavelength of the cholesteric liquid crystal layer 16.

Here, the band short wavelength refers to a band edge in the selective reflection wavelength range of the cholesteric liquid crystal layer 16.

A center wavelength $\lambda_c$ of the selective reflection wavelength of the cholesteric liquid crystal layer is represented by the following equation.

$$\lambda_c = n \times p$$

Here, n represents an average refractive index (=(ne+no)/2) of the liquid crystal, ne represents a refractive index of the liquid crystal in a major axis direction, no represents a refractive index of the liquid crystal in a minor axis direction, and p represents a helical pitch. Typically, two band edge wavelengths $\lambda_1$ and $\lambda_2$ are present as the band edge wavelengths of the selective reflection wavelength range of the cholesteric liquid crystal layer.

$$\lambda_1 = no \times p$$
$$\lambda_2 = ne \times p$$

At this band edge wavelength, laser oscillation can be easily induced based on group velocity anomaly at the band edge. The laser oscillation at the band edge wavelength is described in, for example, "Frontiers of Photofunctional Polymer (CMC Publishing Co., Ltd.).

In addition, from the viewpoint of easiness of laser oscillation, it is preferable that the bright portions and the dark portions observed from the cross-sectional SEM image are linear. In addition, it is preferable that a plurality of bright portions and a plurality of dark portions are parallel to each other, that is, the tilt angle is uniform. As the linearity of the bright portions and the dark portions and the uniformity of the tilt angle increase as a variation in the single period Λ over which the direction of the molecular axis of the liquid crystal compound in the liquid crystal alignment pattern rotates by 180° decreases.

It is preferable that the coefficient of variation of the single period Λ is in the above-described range on both main surface sides of the cholesteric liquid crystal layer.

The single period Λ corresponds to an interval of the bright portions and the dark portions in the cross-sectional SEM image. Accordingly, the coefficient of variation of the single period Λ (standard deviation/average value) may be calculated by measuring the interval of the bright portions and the dark portions at 10 points on each of both main surfaces of the cholesteric liquid crystal layer.

Here, in the example, the liquid crystal compound 40 in which the optical axis A is parallel to the arrow X direction is tilted uniformly in the thickness direction, and the tilt angle of the bright portions and the dark portions is uniform in the thickness direction as shown in FIG. 3. However the present invention is not limited to this configuration.

Figure 6:
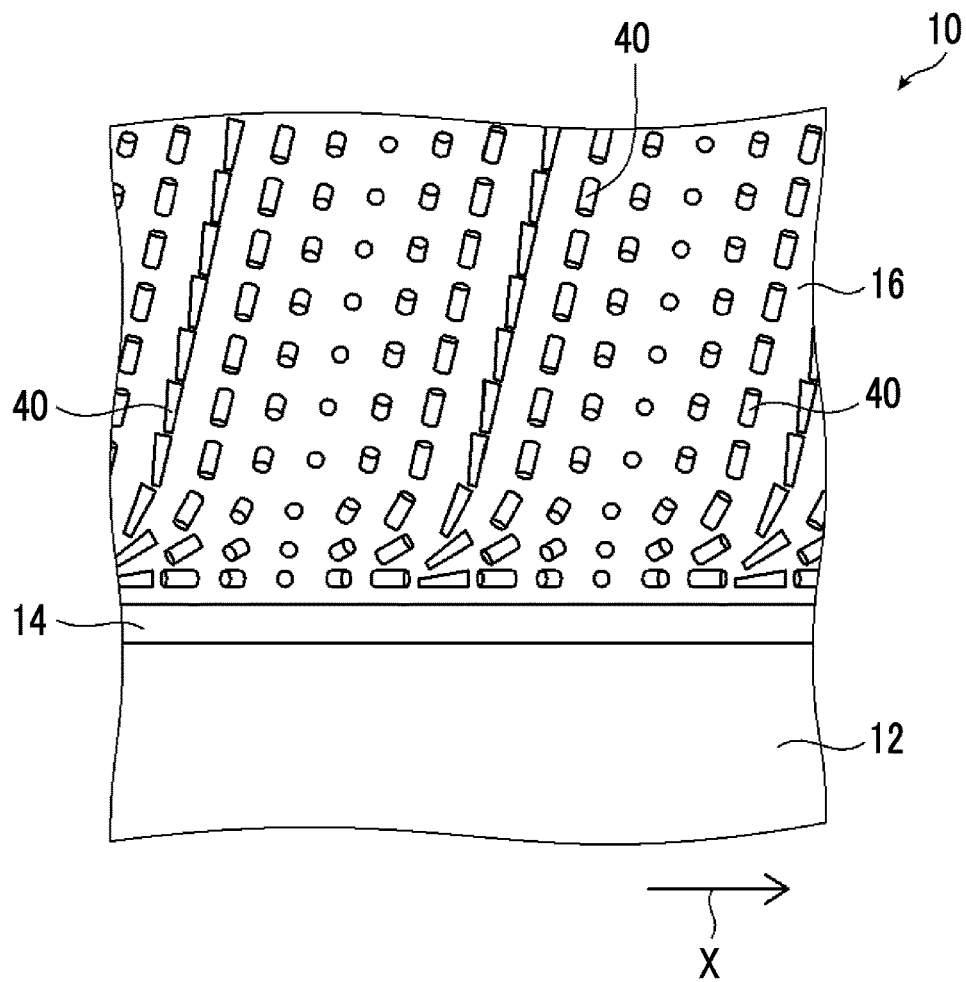
FIG. 6 is a cross-sectional view conceptually showing another example of the cholesteric liquid crystal layer in the laser oscillation element according to the embodiment of the present invention.

As in the example shown in FIG. 6, a configuration may be adopted in which, in the vicinity of the surface of a polarizing film 14 side of the cholesteric liquid crystal layer 16, the liquid crystal compound 40 is arranged parallel to the surface of the cholesteric liquid crystal layer 16, and as the distance from the alignment film 14 in the thickness direction increases, the tilt angle of the liquid crystal compound 40 with respect to the surface of the cholesteric liquid crystal layer 16 increases and becomes constant.

FIG. 6 does not show the colorant in order to describe the arrangement of the liquid crystal compound 40.

Figure 7:
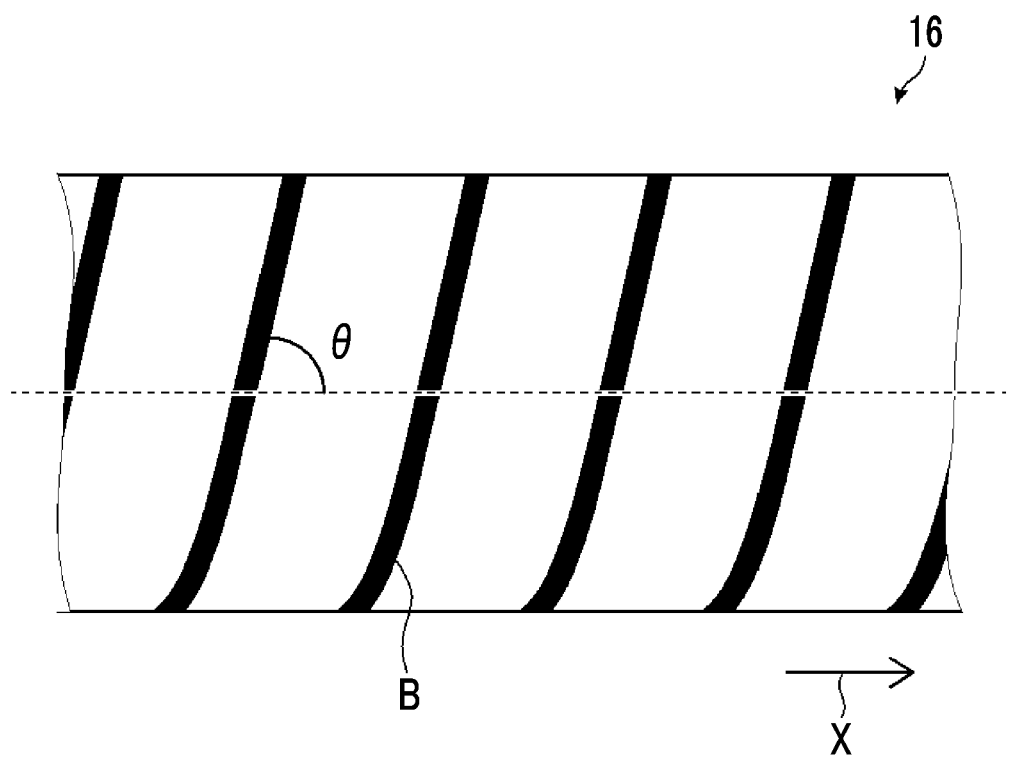
FIG. 7 is a diagram conceptually showing a cross-sectional SEM image of the cholesteric liquid crystal layer shown in FIG. 6.

In this case, as shown in FIG. 7, in the cross-sectional SEM image, the bright portions and the dark portions are tilted to rise up to a predetermined tilt angle θ from the lower side (the alignment film 14 side) to the upper side (the air interface side) in the vicinity of the surface, and are tilted at the constant tilt angle θ from the position of the predetermined tilt angle θ to the surface of the upper side (the air interface side).

This way, a region in the vicinity of the surface in the thickness direction may include a region where the tilt angle of the bright portions and the dark portions changes.

This way, as shown in FIG. 7, in the region in the vicinity of the surface in the thickness direction includes a region where the tilt angle of the bright portions and the dark portions changes, from the viewpoints of easiness of laser oscillation and the like, the proportion of the region where the tilt angle θ is constant in the thickness direction is preferably 50% or more, more preferably 70% or more, and still more preferably 80% or more.

Figure 8:
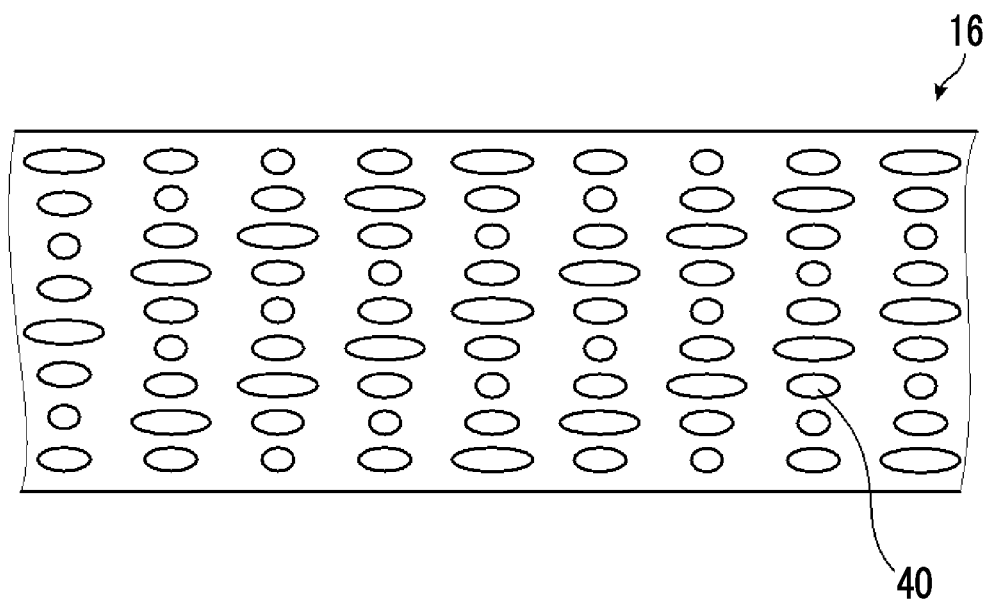
FIG. 8 is a cross-sectional view conceptually showing still another example of the cholesteric liquid crystal layer in the laser oscillation element according to the embodiment of the present invention.

In addition, in the example shown in FIG. 1, the liquid crystal compound 40 where the optical axis A is parallel to the arrow X direction is tilted with respect to the surface of the cholesteric liquid crystal layer 16, but the present invention is not limited thereto. As shown in FIG. 8, the liquid crystal compound 40 may be parallel to the surface of the cholesteric liquid crystal layer 16. FIG. 8 does not show the colorant in order to describe the arrangement of the liquid crystal compound 40.

This way, in a case where the liquid crystal compound 40 is parallel to the surface of the cholesteric liquid crystal layer 16, the bright portions and the dark portions observed from the cross-sectional SEM image can be tilted with respect to the surface of the cholesteric liquid crystal layer 16 as shown in FIG. 3.

In the laser oscillation element according to the embodiment of the present invention, from the viewpoint of suitably inducing laser oscillation, it is preferable that the liquid crystal compound 40 where the optical axis A is parallel to the arrow X direction is tilted with respect to the surface of the cholesteric liquid crystal layer 16. In addition, it is more preferable that the tilt angle of the liquid crystal compound 40 where the optical axis A is parallel to the arrow X direction with respect to the surface of the cholesteric liquid crystal layer 16 is substantially the same as the tilt angle θ of the bright portions and the dark portions.

Here, as the colorant 42, a dichroic colorant is preferable.

The dichroic colorant is basically rod-shaped. Therefore, in a case where the dichroic colorant is dispersed in the rod-shaped liquid crystal compound, the dichroic colorant is likely to be arranged in the one in-plane direction depending on the alignment of the liquid crystal compound.

By arranging the dichroic colorant to be parallel or perpendicular to the alignment direction of the liquid crystal molecules, laser oscillation is likely to be induced at the band edge wavelength of the selective reflection wavelength range of the cholesteric liquid crystal layer.

In addition, in the present invention, the cholesteric liquid crystal layer may be in a state where the cholesteric liquid crystalline phase is immobilized through a curing process such as polymerization or may be in a state where the cholesteric liquid crystalline phase is not immobilized.

Here, the most typical and preferable aspect of the state where a cholesteric liquid crystalline phase is "immobilized" is a state in which the alignment of the liquid crystal compound as the cholesteric liquid crystalline phase is immobilized. The state where the cholesteric liquid crystalline phase is "immobilized" is not limited to the above-described aspect and, specifically, is a state where the immobilized alignment state can be stably maintained without being fluid and being changed by an external field or an external force in a temperature range of typically 0° C. to 50° C., more strictly, −30° C. to 70° C. In the present invention, as described below, it is preferable that the alignment state of the cholesteric liquid crystalline phase is immobilized through a curing reaction that progresses by ultraviolet irradiation.

The layer in which a cholesteric liquid crystalline phase is immobilized is not particularly limited as long as the optical characteristics of the cholesteric liquid crystalline phase are maintained, and the composition in the layer does not need to exhibit liquid crystallinity.

In addition, in a case where the cholesteric liquid crystal layer is in a state where the cholesteric liquid crystalline phase is not immobilized, both main surfaces of the cholesteric liquid crystal layer may be sandwiched between supports to hold the cholesteric liquid crystal layer. In this case, the alignment film only needs to be formed on at least one surface of the support, and it is preferable that the alignment film is formed on both surfaces of the support.

In a case where the cholesteric liquid crystal layer is in a state where the cholesteric liquid crystalline phase is not immobilized, the pitch of the helical structure of the cholesteric liquid crystalline phase can be adjusted by applying an electric field to the cholesteric liquid crystal layer from the outside. As described above, the selective reflection wavelength range of the cholesteric liquid crystal layer depends on the pitch of the helical structure in the cholesteric liquid crystalline phase. In addition, as described above, the laser oscillation in the laser oscillation element is likely to be induced at the band short wavelength of the selective reflection wavelength of the cholesteric liquid crystal layer 16. Therefore, in a case where the pitch of the helical structure of the cholesteric liquid crystalline phase is adjusted by applying an electric field to the cholesteric liquid crystal layer, the band short wavelength of the selective reflection wavelength of the cholesteric liquid crystal layer 16 changes. As a result, a wavelength for inducing laser oscillation changes. That is, in a case where the cholesteric liquid crystal layer of the laser oscillation element is in the state where the cholesteric liquid crystalline phase is not immobilized, the pitch of the helical structure of the cholesteric liquid crystalline phase can be adjusted by applying an electric field to the cholesteric liquid crystal layer. As a result, a wavelength-variable laser oscillation element where a wavelength for inducing laser oscillation can be adjusted can be obtained.

In the present invention, in the cholesteric liquid crystal layer, by reversing the rotation direction of the optical axis 40A of the liquid crystal compound 40 toward the arrow X direction, the tilt direction of the bright portions and the dark portions can be reversed. That is, in FIGS. 1 and 2, the rotation direction of the optical axis 40A toward the arrow X direction is counterclockwise, and the bright portions and the dark portions are tilted to fall in the arrow X direction.

On the other hand, by setting the rotation direction of the optical axis 40A in the arrow X direction to be clockwise, the tilt of the bright portions and the dark portions are reversed, and the bright portions and the dark portions are tilted to rise in the arrow X direction. In other words, this aspect is the same as a case where the arrow X direction in which the optical axis 40A rotates counterclockwise is reversed.

Further, as described above, in the cholesteric liquid crystal layer 16 that reflects left circularly polarized light and the cholesteric liquid crystal layer that reflects right circularly polarized light, the helical turning directions of the liquid crystal compounds 40 are opposite to each other. Accordingly, in a case where the cholesteric liquid crystal layer has the liquid crystal alignment pattern in which the optical axis 40A rotates counterclockwise in the arrow X direction as in the example shown in the drawing, the tilt of the bright portions and the dark portion in the cholesteric liquid crystal layer that reflects right circularly polarized light is opposite to that of the cholesteric liquid crystalline phase that reflects left circularly polarized light.

<<Method of Forming Cholesteric Liquid Crystal Layer>>

The cholesteric liquid crystal layer 16 can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

A method of forming the cholesteric liquid crystal layer 16 is not limited, and various well-known forming methods can be used.

In particular, in the following method of forming the cholesteric liquid crystal layer according to the embodiment of the present invention, the cholesteric liquid crystal layer 16 according to the embodiment of the present invention can be stably and suitably formed, which is preferable.

As described above, the cholesteric liquid crystal layer 16 may be in a state where the cholesteric liquid crystalline phase is not immobilized.

<<Liquid Crystal Composition>>

Examples of a material used for forming the cholesteric liquid crystal layer 16 include a liquid crystal composition including a liquid crystal compound and a chiral agent. In addition, the material for forming the cholesteric liquid crystal layer 16 may further include a tilt alignment agent. The tilt alignment agent is an additive that stabilizes the tilt alignment of the liquid crystal compound. It is preferable to use a chiral agent in which a helical twisting power decreases due to light irradiation. In addition, it is preferable that the liquid crystal compound is a polymerizable liquid crystal compound.

In addition, the liquid crystal composition used for forming the cholesteric liquid crystal layer may further include a surfactant or the like.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

The chiral agent in which back isomerization, dimerization, isomerization, dimerization or the like occurs due to light irradiation such that the helical twisting power (HTP) decreases is preferably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

The content of the chiral agent in the liquid crystal composition is preferably 0.01 to 200 mol % and more preferably 1 to 30 mol % with respect to the content molar amount of the liquid crystal compound.

—Tilt Alignment Agent—

The liquid crystal composition used for forming the cholesteric liquid crystal layer may include a tilt alignment agent (vertical alignment agent).

The tilt alignment agent is an additive that stabilizes tilt alignment of the liquid crystal compound by being developed in a region having a pretilt angle at at least one interface on the alignment film side or the air interface side. In other words, the tilt alignment agent is an additive having an effect of stabilizing the tilt alignment of the liquid crystal in a case where the liquid crystal compound is tilted and aligned with respect to the main surface of the liquid crystal layer. This tilt alignment also includes alignment at 90° with respect to the main surface of the liquid crystal layer.

The tilt alignment agent is not particularly limited, and various compounds that exhibit the above-described effect can be used. In particular, in a case where the liquid crystal composition is applied to the alignment film, an air interface alignment agent that can impart a pretilt angle to the air interface side is preferable.

Preferable examples of the tilt alignment agent (air interface alignment agent) include a fluoropolymer (Y) having a polar group shown below.

(Fluoropolymer (Y))

The fluoropolymer (Y) includes a polar group.

Here, the polar group refers to a group having at least one heteroatom, and specific examples thereof include a hydroxyl group, a carbonyl group, a carboxy group, an amino group, a nitro group, an ammonium group, and a cyano group. Among these, a hydroxyl group or a carboxy group is preferable.

In the present invention, it is preferable that the fluoropolymer (Y) includes a constitutional unit represented by the following Formula (C).

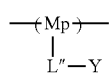  (C)

(In Formula (C), Mp represents a trivalent group forming a part of a polymer main chain, L represents a single bond or a divalent linking group, and Y represents a polar group.)

In Formula (C), Mp represents a trivalent group forming a part of a polymer main chain.

Preferable examples of Mp include a substituted or unsubstituted long-chain or branched alkylene group having 2 to 20 carbon atoms (not including the number of carbon atoms in a substituent; hereinafter, the same is applied to the groups in Mp) (for example, an ethylene group, a propylene group, a methylethylene group, a butylene group, or a hexylene group), a substituted or unsubstituted cyclic alkylene group having 3 to 10 carbon atoms (for example, a cyclopropylene group, a cyclobutylene group, or a cyclohexylene group), a substituted or unsubstituted vinylene group, a substituted or unsubstituted cyclic vinylene group, a substituted or unsubstituted phenylene group, a group having an oxygen atom (for example, a group having an ether group, an acetal group, an ester group, a carbonate group, or the like), a group having a nitrogen atom (for example, group having an amino group, an imino group, an amide group, a urethane group, a ureido group, an imide group, an imidazole group, an oxazole group, a pyrrole group, an anilide group, a maleinimide group, or the like), a group having a sulfur atom (for example, a group having a sulfide group, a sulfone group, a thiophene group, or the like), a group having a phosphorus atom (for example, a group having a phosphine group, a phosphate group, or the like), a group having a silicon atom (for example, a group having a siloxane group), a group obtained by linking two or more of the above-described groups, and a group obtained by substituting one hydrogen atom in each of the above-described groups with a -L-X group.

Among these, a substituted or unsubstituted ethylene group, a substituted or unsubstituted methylethylene group, a substituted or unsubstituted cyclohexylene group, or a substituted or unsubstituted vinylene group where one hydrogen atom is substituted with a -L-X group is preferable, a substituted or unsubstituted ethylene group, a substituted or unsubstituted methylethylene group, or a substituted or unsubstituted vinylene group where one hydrogen atom is substituted with a -L-X group is more preferable, and a substituted or unsubstituted ethylene group or a substituted or unsubstituted methylethylene group where one hydrogen atom is substituted with a -L-X group is still more preferable. Specifically, Mp-1 or Mp-2 described below is preferable.

L represents a single bond or a divalent linking group. The divalent linking group represented by L is not particularly limited, and examples thereof include a divalent linking group represented by L" described below.

X represents a substituted or unsubstituted fused ring functional group. The number of rings in the substituted or unsubstituted fused ring functional group represented by X is not limited and is preferably 2 to 5. The substituted or unsubstituted fused ring functional group may be a hydrocarbon aromatic fused ring consisting of only carbon atoms as atoms forming the ring, or may be an aromatic fused ring in which heterocycles including heteroatoms as ring-constituting atoms are fused.

In addition, for example, it is preferable that X represents a substituted or unsubstituted indenyl group having 5 to 30 carbon atoms, a substituted or unsubstituted naphthyl group having 6 to 30 carbon atoms, a substituted or unsubstituted fluorenyl group having 12 to 30 carbon atoms, an anthryl group, a pyrenyl group, a perylenyl group, or a phenanthrenyl group.

Hereinafter, specific preferable example of Mp will be shown, but Mp is not limited to these examples. In addition, a moiety represented by * in Mp represents a moiety linked to L.

  (Mp-1)

  (Mp-2)

  (Mp-3)

  (Mp-4)

  (Mp-5)

  (Mp-6)

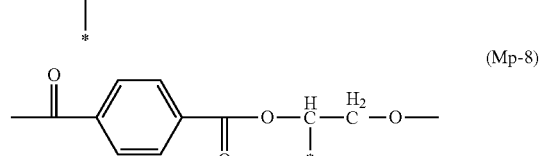  (Mp-7)

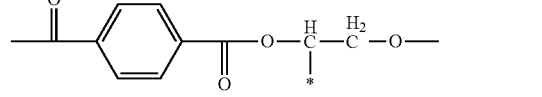  (Mp-8)

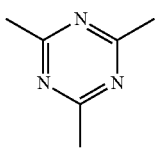
(Mp-9)

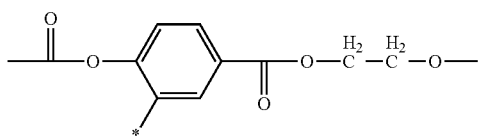
(Mp-10)

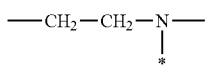
(Mp-11)

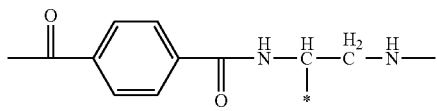
(Mp-12)

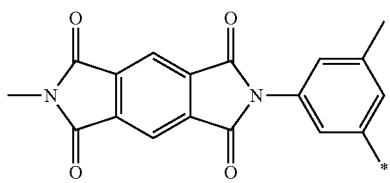
(Mp-13)

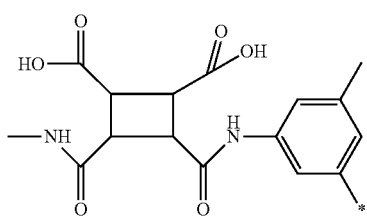
(Mp-14)

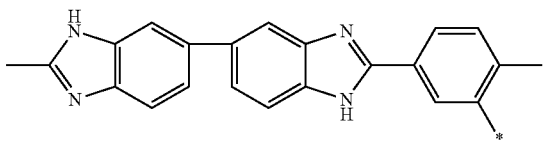
(Mp-15)

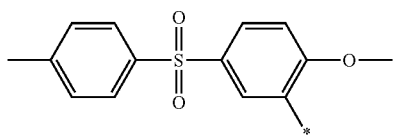
(Mp-16)

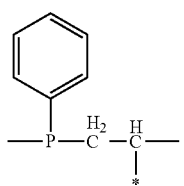
(Mp-17)

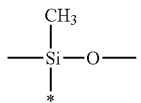
(Mp-18)

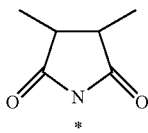
(Mp-19)

In a case where L" (a single bond or a divalent linking group) in Formula (A) represents a divalent linking group, it is preferable that the divalent linking group is a divalent linking group represented by *-L1-L3- (* represents a linking site to a main chain) where L1 represents *—COO—, *—CONH—, *—OCO—, or *—NHCO— and L3 represents an alkylene group having 2 to 20 carbon atoms, a polyoxyalkylene group having 2 to 20 carbon atoms, —C(=O)—, —OC(=O)O—, an aryl group, or a divalent linking group including a combination thereof.

Among these, it is preferable that L" represents a single bond; a divalent linking group where L1 represents *—COO and L3 represents a divalent linking group including a combination of an alkylene group, —OC(=O)O—, and an aryl group; or a divalent linking group where L1 represents *—COO— and L3 represents a polyoxyalkylene group having 2 to 20 carbon atoms.

In addition, examples of the polar group represented by Y in Formula (C) include a hydroxyl group, a carbonyl group, a carboxy group, an amino group, a nitro group, an ammonium group, and a cyano group. Among these, any one of a hydroxyl group, a carboxy group, or a cyano group is preferable as the polar group.

In addition, in addition to the constitutional unit represented by Formula (C), it is preferable that the fluoropolymer (Y) includes, for example, a constitutional unit derived from a fluoroaliphatic group-containing monomer, and it is more preferable that the fluoropolymer (X) includes a constitutional unit represented by the following Formula (B).

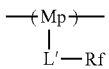

(B)

(In Formula (B), Mp represents a trivalent group forming a part of a polymer main chain, L' represents a single bond or a divalent linking group, and Rf represents a substituent having at least one fluorine atom).

Mp in Formula (B) has the same definition and the same preferable range as Mp in Formula (C).

In a case where L' (a single bond or a divalent linking group) represents a divalent linking group, the divalent linking group is preferably —O—, —$NR^{a11}$— (where $R^{a11}$ represents a hydrogen atom, an aliphatic hydrocarbon group having 1 to 10 carbon atoms, or an aryl group having 6 to 20 carbon atoms), —S—, —C(=O)—, —S(=O)$_2$—, a substituted or unsubstituted alkylene group having 1 to 20 carbon atoms, or and a divalent linking group selected from groups formed by two or more of the above-described groups being linked to each other.

Examples of the divalent linking group formed by two or more of the above-described groups being linked to each other include —C(=O)O—, —OC(=O)—, —OC(=O)O—, —C(=O)NH—, —NHC(=O)—, and —C(=O)O(CH$_2$)$_{ma}$O— (where ma represents an integer of 1 to 20).

Further, in a case where Mp in Formula (B) represents Mp-1 or Mp-2, L' represents —O—, —NR$^{a11}$— (R$^{a11}$ represents preferably a hydrogen atom or an aliphatic hydrocarbon group having 1 to 10 carbon atoms), —S—, —C(=O)—, —S(=O)$_2$—, a substituted or unsubstituted alkylene group having 1 to 20 carbon atoms, or a divalent linking group selected from groups formed by two or more of the above-described groups being linked to each other, and more preferably —O—, —C(=O)O—, —C(=O)NH—, or a divalent linking group consisting of one or more of the above-described groups and an alkylene group.

Preferable examples of Rf include an aliphatic hydrocarbon group having 1 to 30 carbon atoms in which at least one fluorine atom is substituted (for example, a trifluoroethyl group, a perfluorohexylethyl group, a perfluorohexylpropyl group, a perfluorobutylethyl group, or a perfluorooctylethyl group). In addition, it is preferable that Rf has a CF$_3$ group or a CF$_2$H group at a terminal, and it is more preferable Rf has a CF$_3$ group at a terminal.

It is more preferable that Rf represents an alkyl group having a CF$_3$ group at a terminal or an alkyl group having a CF$_2$H group at a terminal. The alkyl group having a CF$_3$ group at a terminal is an alkyl group in which a part or all of hydrogen atoms in the alkyl group are substituted with fluorine atoms. An alkyl group having a CF$_3$ group at a terminal in which 50% or higher of hydrogen atoms are substituted with fluorine atoms is preferable, an alkyl group having a CF$_3$ group at a terminal in which 60% or higher of hydrogen atoms are substituted with fluorine atoms is more preferable, and an alkyl group having a CF$_3$ group at a terminal in which 70% or higher of hydrogen atoms are substituted with fluorine atoms is still more preferable. The remaining hydrogen atoms may be further substituted with a substituent described below as an example of a substituent group D.

The alkyl group having a CF$_2$H group at a terminal is an alkyl group in which a part or all of hydrogen atoms in the alkyl group are substituted with fluorine atoms. An alkyl group having a CF$_2$H group at a terminal in which 50% or higher of hydrogen atoms are substituted with fluorine atoms is preferable, an alkyl group having a CF$_2$H group at a terminal in which 60% or higher of hydrogen atoms are substituted with fluorine atoms is more preferable, and an alkyl group having a CF$_2$H group at a terminal in which 70% or higher of hydrogen atoms are substituted with fluorine atoms is still more preferable. The remaining hydrogen atoms may be further substituted with a substituent described below as an example of a substituent group D.

Substituent Group D

The substituent group D includes an alkyl group (an alkyl group having preferably 1 to 20 carbon atoms, more preferably 1 to 12 carbon atoms, and still more preferably 1 to 8 carbon atoms; for example, a methyl group, an ethyl group, an isopropyl group, a tert-butyl group, an n-octyl group, an n-decyl group, an n-hexadecyl group, a cyclopropyl group, a cyclopentyl group, or a cyclohexyl group), an alkenyl group (an alkenyl group having preferably 2 to 20 carbon atoms, more preferably 2 to 12 carbon atoms, and still more preferably 2 to 8 carbon atoms; for example, a vinyl group, a 2-butenyl group, or a 3-pentenyl group), an alkynyl group (an alkynyl group having preferably 2 to 20 carbon atoms, more preferably 2 to 12 carbon atoms, and still more preferably 2 to 8 carbon atoms; for example, a propargyl group or a 3-pentynyl group), a substituted or unsubstituted amino group (an amino group having preferably 0 to 20 carbon atoms, more preferably 0 to 10 carbon atoms, still more preferably 0 to 6 carbon atoms; for example, a unsubstituted amino group, a methylamino group, a dimethylamino group, or a diethylamino group), an alkoxy group (an alkoxy group having preferably 1 to 20 carbon atoms, more preferably 1 to 12 carbon atoms, and still more preferably 1 to 8 carbon atoms; for example, a methoxy group, an ethoxy group, or a butoxy group), an acyl group (an acyl group having preferably 1 to 20 carbon atoms, more preferably 1 to 16 carbon atoms, and still more preferably 1 to 12 carbon atoms; for example, an acetyl group, a formyl group, or a pivaloyl group), an alkoxycarbonyl groups (an alkoxycarbonyl group having preferably 2 to 20 carbon atoms, more preferably 2 to 16 carbon atoms, and still more preferably 2 to 12 carbon atoms; for example, a methoxycarbonyl group or an ethoxycarbonyl group), an acyloxy group (an acyloxy group having preferably 2 to 20 carbon atoms, more preferably 2 to 16 carbon atoms, and still more preferably 2 to 10 carbon atoms; for example, an acetoxy group), an acylamino group (an acylamino group having preferably 2 to 20 carbon atoms, more preferably 2 to 16 carbon atoms, and still more preferably 2 to 10 carbon atoms; for example, an acetylamino group), an alkoxycarbonylamino group (an alkoxycarbonylamino group having preferably 2 to 20 carbon atoms, more preferably 2 to 16 carbon atoms, and still more preferably 2 to 12 carbon atoms; for example, a methoxycarbonylamino group), a sulfonylamino group (a sulfonylamino group having preferably 1 to 20 carbon atoms, more preferably 1 to 16 carbon atoms, and still more preferably 1 to 12 carbon atoms; for example, a methanesulfonylamino group or an ethanesulfonylamino group), a sulfamoyl group (a sulfamoyl group having preferably 0 to 20 carbon atoms, more preferably 0 to 16 carbon atoms, and still more preferably 0 to 12 carbon atoms; for example, a sulfamoyl group, a methylsulfamoyl group, or a dimethylsulfamoyl group), an alkylthio group (an alkylthio group having preferably 1 to 20 carbon atoms, more preferably from 1 to 16 carbon atoms, and still more preferably from 1 to 12 carbon atoms; for example, a methylthio group or an ethylthio group), a sulfonyl group (a sulfonyl group having preferably 1 to 20 carbon atoms, more preferably from 1 to 16 carbon atoms, and still more preferably from 1 to 12 carbon atoms; for example, a mesyl group or a tosyl group), a sulfinyl group (a sulfinyl group having preferably 1 to 20 carbon atoms, more preferably from 1 to 16 carbon atoms, and still more preferably from 1 to 12 carbon atoms; for example, a methanesulfinyl group or an ethanesulfinyl group), a ureido group (a ureido group having preferably 1 to 20 carbon atoms, more preferably 1 to 16 carbon atoms, and still more preferably 1 to 12 carbon atoms; for example, an unsubstituted ureido group or a methylureido group), a phosphoric amide group (a phosphoric amide group having preferably 1 to 20 carbon atoms, more preferably 1 to 16 carbon atoms, and still more preferably 1 to 12 carbon atoms; for example, a diethylphosphoric amide group), a hydroxyl group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, and a silyl group (a silyl group having preferably from 3 to 40 carbon atoms, more preferably from 3 to 30 carbon atoms, and still more preferably from 3 to 24 carbon atoms; for example, a trimethylsilyl group). The substituents may be further substituted with the substituents. In addition, in a case where two or more substituents are present, the substituents may be the same as or different from each other. In addition, if possible, the substituents may be bonded to each other to form a ring.

Examples of the alkyl group having a $CF_3$ group at a terminal or the alkyl group having a $CF_2H$ group at a terminal are as follows.

R1: n-$C_8F_{17}$-
R2: n-$C_6F_{13}$-
R3: n-$C_4F_9$-
R4: n-$C_8F_{17}$—$(CH_2)_2$-
R5: n-$C_6F_{13}$—$(CH_2)_3$-
R6: n-$C_4F_9$—$(CH_2)_2$-
R7: H—$(CF_2)_8$-
R8: H—$(CF_2)_6$-
R9: H—$(CF_2)_4$-
R10: H—$(CF_2)_8$—$(CH_2)_2$-
R11: H—$(CF_2)_6$—$(CH_2)_3$-
R12: H—$(CF_2)_4$—$(CH_2)_2$-
R13: n-$C_7F_{15}$—$(CH_2)_2$-
R14: n-$C_6F_{13}$—$(CH_2)_3$-
R15: n-$C_4F_9$—$(CH_2)_2$-

Hereinafter, specific examples of the constitutional unit derived from the fluoroaliphatic group-containing monomer will be shown, but the present invention is not limited thereto.

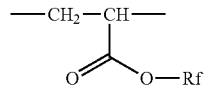

(B-1)

| Rf = | —$CH_2CH_2C_4F_9$ | (B-2) |
| | —$CH_2CH_2CH_2C_4F_9$ | (B-3) |
| | —$CH_2CH_2C_6F_{13}$ | (B-4) |
| | —$CH_2CH_2C_8F_{17}$ | (B-5) |
| | —$CH_2CH_2OCH_2CH_2C_4F_9$ | (B-6) |
| | —$CH_2CH_2OCH_2CH_2CH_2C_4F_9$ | (B-7) |
| | —$CH_2CH_2OCH_2CH_2C_6F_{13}$ | (B-8) |
| | —$CH_2CH_2OCH_2CH_2C_8F_{17}$ | (B-9) |
| | —$CH_2CH_2C_4F_8H$ | (B-10) |
| | —$CH_2CH_2CH_2C_4F_8H$ | (B-11) |
| | —$CH_2CH_2C_6F_{12}H$ | (B-12) |
| | —$CH_2CH_2C_8F_{16}H$ | (B-13) |
| | —$CH_2CH_2OCH_2CH_2C_4F_8H$ | (B-14) |
| | —$CH_2CH_2OCH_2CH_2CH_2C_4F_8H$ | (B-15) |
| | —$CH_2CH_2OCH_2CH_2C_6F_{12}H$ | (B-16) |
| | —$CH_2CH_2OCH_2CH_2C_8F_{16}H$ | (B-17) |

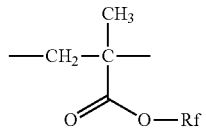

| Rf = | —$CH_2CH_2C_4F_9$ | (B-18) |
| | —$CH_2CH_2CH_2C_4F_9$ | (B-19) |
| | —$CH_2CH_2C_6F_{13}$ | (B-20) |
| | —$CH_2CH_2C_8F_{17}$ | (B-21) |
| | —$CH_2CH_2OCH_2CH_2C_4F_9$ | (B-22) |
| | —$CH_2CH_2OCH_2CH_2CH_2C_4F_9$ | (B-23) |
| | —$CH_2CH_2OCH_2CH_2C_6F_{13}$ | (B-24) |
| | —$CH_2CH_2OCH_2CH_2C_8F_{17}$ | (B-25) |
| | —$CH_2CH_2C_4F_8H$ | (B-26) |
| | —$CH_2CH_2CH_2C_4F_8H$ | (B-27) |
| | —$CH_2CH_2C_6F_{12}H$ | (B-28) |
| | —$CH_2CH_2C_8F_{16}H$ | (B-29) |
| | —$CH_2CH_2OCH_2CH_2C_4F_8H$ | (B-30) |
| | —$CH_2CH_2OCH_2CH_2CH_2C_4F_8H$ | (B-31) |
| | —$CH_2CH_2OCH_2CH_2C_6F_{12}H$ | (B-32) |
| | —$CH_2CH_2OCH_2CH_2C_8F_{16}H$ | (B-33) |
| | —$CH_2CH_2OCH_2CH_2C_5F_{10}H$ | (B-34) |

In addition to the constitutional unit having the structure represented by Formula (C) and the constitutional unit derived from the fluoroaliphatic group-containing monomer that is represented by Formula (B), the fluoropolymer (Y) may include a constitutional unit derived from a monomer that is copolymerizable with the monomer forming the constitutional unit.

The copolymerizable monomer is not particularly limited within a range not departing from the scope of the present invention. As the preferable monomer, for example, from the viewpoint of improving solubility in a solvent or preventing aggregation of a polymer, a monomer forming a hydrocarbon polymer (for example, polyethylene, polypropylene, polystyrene, polymaleimide, polyacrylic acid, polyacrylic acid ester, polyacrylamide, or polyacryl anilide), polyether, polyester, polycarbonate, polyamide, polyamic acid, polyimide, polyurethane, or polyureide can be preferably used.

Further, as the main chain structure, a constitutional unit that is the same as the unit having the group represented by Formula (C) is preferable.

Hereinafter, specific examples of the copolymerizable constitutional unit will be shown, but the present invention is not limited to the following specific examples. In particular, C-2, C-3, C-10, C-11, C-12, or C-19 is preferable, and C-11 or C-19 is more preferable.

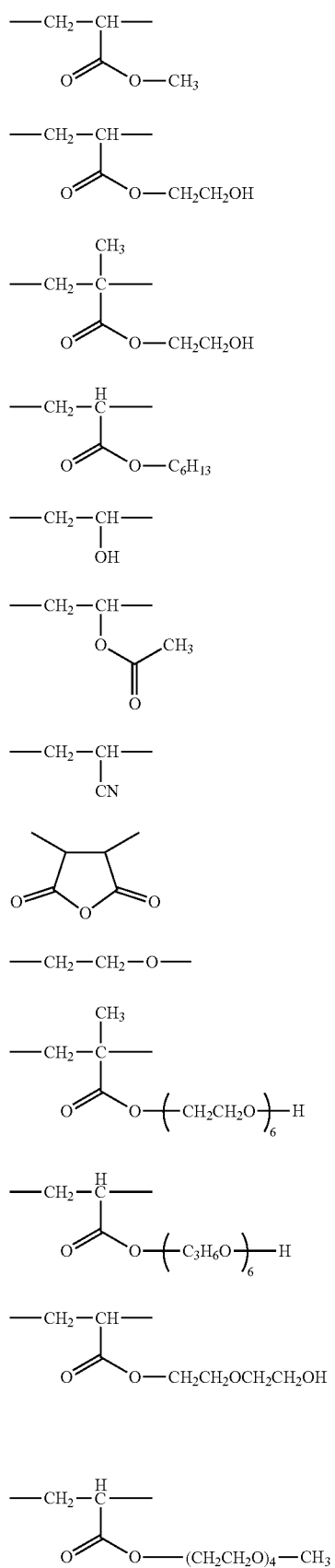
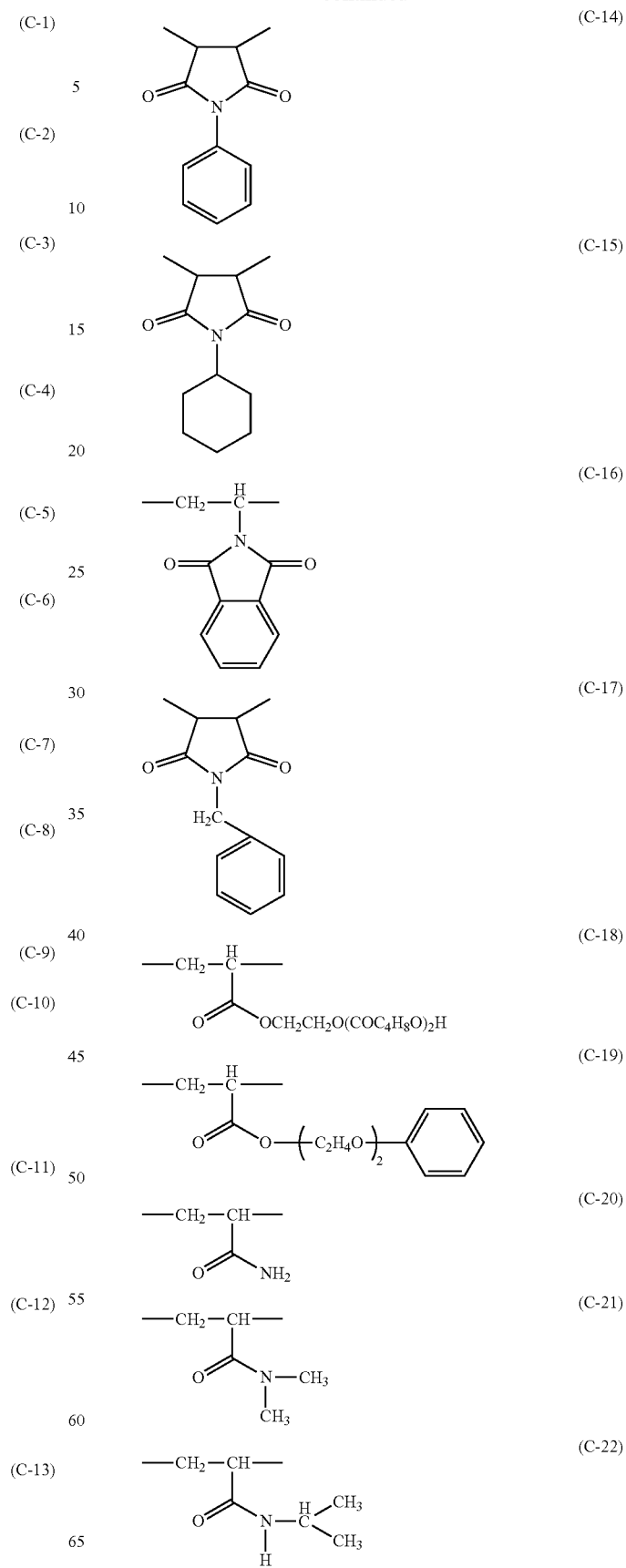

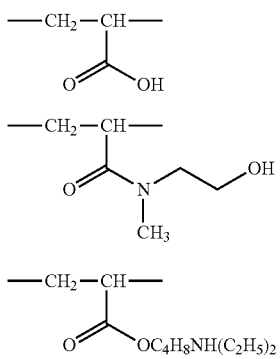

In the fluoropolymer (Y), the content of the constitutional unit represented by Formula (C) is preferably 45 mass % or lower, more preferably 1 to 20 mass %, and still more preferably 2 to 10 mass % with respect to all of the constitutional units of the fluoropolymer (Y).

In addition, in the fluoropolymer (Y), the content of the repeating unit derived from the fluoroaliphatic group-containing monomer (preferably the constitutional unit represented by Formula (B)) is preferably 55 mass % or higher, more preferably 80 to 99 mass % and still more preferably 90 to 98 mass % with respect to all of the constitutional units of the fluoropolymer (Y). The content of a constitutional unit other than the above-described two constitutional units is preferably 60 mass % or lower and more preferably 50 mass % or lower.

In addition, the fluoropolymer (Y) may be a random copolymer into which the respective constitutional units are irregularly introduced or may be a block copolymer into which the respective constitutional units are regularly introduced. In a case where the fluoropolymer (Y) is the block copolymer, the block copolymer may be synthesized by introducing the respective constitutional units in any introduction order or by using the same component twice or more.

In addition, as the constitutional unit represented by Formula (C), the constitutional unit represented by Formula (B), or the like, only one kind may be used, or two or more kinds may be used. In a case where two or more constitutional units represented by Formula (C) are included, it is preferable that Y represents the same polar group. In a case where two or more constitutional units are included, the content refers to a total content.

Further, the range of the weight-average molecular weight (Mw) of the fluoropolymer (Y) is preferably 10000 to 35000 and more preferably 15000 to 30000.

Here, the weight-average molecular weight can be measured as a value in terms of polystyrene (PS) obtained by gel permeation chromatography (GPC).

In the liquid crystal composition for forming the cholesteric liquid crystal layer, the content of the tilt alignment agent (air interface alignment agent) including the fluoropolymer (Y) is preferably 0.2 to 10 mass %, more preferably 0.2 to 5 mass %, and still more preferably 0.2 to 3 mass % with respect to the total solid content of the liquid crystal composition.

—Other Components—

The liquid crystal composition according to the embodiment of the present invention may include components other than the liquid crystal compound, the chiral agent, and the tilt alignment agent.

<<Polymerization Initiator>>

The liquid crystal composition may include a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

In addition from the viewpoints of the uniformity of the coating film and the hardness of the film, the liquid crystal composition may include a polymerizable monomer.

Examples of the polymerizable monomer include a radically polymerizable compound or a cationically polymerizable compound. The polymerizable monomer is preferably a polyfunctional radically polymerizable monomer and is preferably copolymerizable with the disk-shaped liquid crystal compound having the polymerizable group. For example, compounds described in paragraphs "0018" to "0020" in JP2002-296423A can be used.

The addition amount of the polymerizable monomer is preferably 1 to 50 parts by mass and more preferably 5 to 30 parts by mass with respect to 100 parts by mass of the liquid crystal compound.

<<Surfactant>>

The liquid crystal composition used for forming the cholesteric liquid crystal layer may include a surfactant from the viewpoints of the uniformity of the coating film and the hardness of the film.

It is preferable that the surfactant is a compound that can function as an alignment control agent contributing to the stable or rapid formation of a cholesteric liquid crystalline phase with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

<<Solvent>>

In a case where the cholesteric liquid crystal layer is formed, it is preferable that the liquid crystal composition is used as liquid. Accordingly, the liquid crystal composition may include a solvent.

The solvent is not particularly limited and can be appropriately selected depending on the purpose. An organic solvent is preferable. Examples of the organic solvent include amides (for example, N,N-dimethylformamide), sulfoxides (for example, dimethyl sulfoxide), heterocyclic compounds (for example, pyridine), hydrocarbons (for example, benzene, or hexane), alkyl halides (for example, chloroform or dichloromethane), esters (for example, methyl acetate, ethyl acetate, or butyl acetate), ketones (for example, acetone or methyl ethyl ketone), and ethers (for example, tetrahydrofuran or 1,2-dimethoxyethane). Alkyl halide or ketone is preferable. Two or more organic solvents may be used in combination.

<<Onium Salt>>

In a case where the liquid crystal composition for forming the cholesteric layer is applied to the alignment film, the composition includes at least one onium salt in order to provide the region having a pretilt angle on the alignment film side. The onium salt contributes to providing a constant pretilt angle to molecules of the rod-shaped liquid crystal compound on the alignment film interface side. Examples of the onium salt include an onium salt such as an ammonium salt, a sulfonium salt, or a phosphonium salt. A quaternary onium salt is preferable, and a quaternary ammonium salt is more preferable.

In general, the quaternary ammonium salt can be obtained by alkylation (Menschutkin reaction), alkenylation, alkynylation, or arylation of a tertiary amine (for example, trimethylamine, triethylamine, tributylamine, triethanolamine, N-methylpyrrolidine, N-methylpiperidine, N,N-dimethylpiperazine, triethylenediamine, or N,N,N',N'-tetramethylethylenediamine) or a nitrogen-containing heterocycle (for example, a pyridine ring, a picoline ring, a 2,2'-bipyridyl ring, a 4,4'-bipyridyl ring, a 1,10-phenanthroline ring, a quinoline ring, an oxazole ring, a thiazole ring, a N-methylimidazole ring, a pyrazine ring, or a tetrazole ring).

In the present invention, the preferable content of the onium salt in the liquid crystal composition for forming the cholesteric layer varies depending on the kind thereof, and typically is preferably 0.01 to 10 mass %, more preferably 0.05 to 7 mass %, and still more preferably 0.05 to 5 mass % with respect to the content of the rod-shaped liquid crystal compound used in combination. Two or more onium salts may be used. In this case, it is preferable that the total content of all the onium salts to be used is in the above-described range.

<<Crosslinking Agent>>

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

<<Other Additives>>

Optionally, a polymerization inhibitor, an antioxidant, an ultraviolet absorber, a light stabilizer, a coloring material, metal oxide particles, or the like can be added to the liquid crystal composition for forming the cholesteric liquid crystal layer in a range where optical performance and the like do not deteriorate.

<<<Formation of Cholesteric Liquid Crystal Layer>>>

In a case where the cholesteric liquid crystal layer 16 is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

It is preferable that the cholesteric liquid crystal layer is formed using the forming method described below.

That is, the alignment film 14 having an alignment pattern corresponding to the above-described liquid crystal alignment pattern in which the direction of the optical axis 40A rotates in at least one in-plane direction is prepared. Here, the single period Λ in the liquid crystal alignment pattern is set depending on the tilt angle θ of the bright portions and the dark portions. Therefore, it is preferable that the alignment film 14 has the alignment pattern such that the single period Λ in the liquid crystal alignment pattern is the set length.

The above-described liquid crystal composition including the liquid crystal compound and the chiral agent is applied to the alignment film 14 (application step).

For the application of the liquid crystal composition, a printing method such as ink jet or scroll printing or a well-known method such as spin coating, bar coating, or spray coating capable of uniformly applying liquid to a sheet-shaped material can be used. In addition, the thickness of the coating film of the liquid crystal composition is not particularly limited and may be appropriately set depending on the thickness of the formed cholesteric liquid crystal layer 16.

After the coating film of the liquid crystal composition is formed, a heating step of heating the liquid crystal composition is performed. Through the heating step, the liquid crystal compound 40 is aligned as described above.

The temperature of the heating treatment is not particularly limited, and the temperature at which the liquid crystal compound 40 can be aligned to the cholesteric liquid crystalline phase may be appropriately set depending on the liquid crystal compound 40 or the like. The temperature of the heating treatment is preferably 25° C. to 140° C., more preferably 50° C. to 120° C., and still more preferably 60° C. to 100° C.

In addition, the heating treatment time is also not particularly limited and is preferably 10 to 600 seconds, more preferably 15 to 300 seconds, and still more preferably 30 to 200 seconds.

The aligned liquid crystal compound is optionally further polymerized (curing step). Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

In addition, in a case where a chiral agent where HTP changes is used as the chiral agent, it is preferable to perform a first exposure step of decreasing the HTP of the chiral agent is performed between the heating step and the curing step.

As a result, even in a case where the tilt angle θ of the bright portions and the dark portions is large, the cholesteric liquid crystal layer can be stably formed.

The light used for the first exposure step is not particularly limited, and it is preferable to use ultraviolet light. The wavelength of irradiated ultraviolet light is preferably 250 to 430 nm. In the first exposure step and the exposure in the curing step, it is preferable that light components having different wavelengths are used. That is, in the first exposure step, it is preferable that light having a wavelength at which the liquid crystal composition is not cured is used.

The total irradiation energy is preferably 2 mJ/cm$^2$ to 50 J/cm$^2$ and more preferably 5 to 1500 mJ/cm$^2$. In order to promote a photopolymerization reaction, the exposure may be performed under heating conditions or in a nitrogen atmosphere.

Hereinabove, the laser oscillation element according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Alignment Film)

A glass substrate was used as the support.

The following coating solution for forming an alignment film was applied to the support using a spin coater at 2500 rpm for 30 seconds (application step). The support on which the coating film of the coating solution for forming an alignment film was formed was dried using a hot plate at 60° C. for 60 seconds (drying step). As a result, an alignment film was formed.

Coating Solution for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

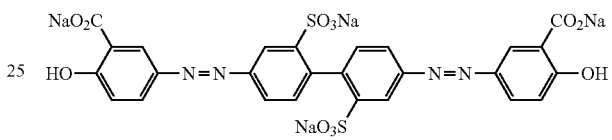

(Exposure of Alignment Film (Exposure Step))

The alignment film was exposed using the exposure device shown in FIG. 9 to form an alignment film having an alignment pattern.

In the exposure device, a laser that emits laser light having a wavelength (325 nm) was used as the laser. The exposure dose of the interference light was 300 mJ/cm$^2$. An intersecting angle (intersecting angle α) between the two beams was adjusted to 74° such that the single period Λ (the length over which the optical axis rotates by 180°) of an alignment pattern formed by interference of two laser beams was 0.27 μm.

(Formation of Cholesteric Liquid Crystal Layer)

As the liquid crystal composition forming the cholesteric liquid crystal layer, the following liquid crystal composition was prepared.

Liquid Crystal Composition

| | |
|---|---|
| Liquid crystal compound L-1 | 100.00 parts by mass |
| Polymerization initiator I-2 | 3.00 parts by mass |
| Alignment agent T-1 | 0.20 parts by mass |
| Chiral agent Ch-1 | 4.40 parts by mass |
| Chiral agent Ch-2 | 1.00 parts by mass |
| Colorant DCM 4-(dicyanomethylene)-2-methyl-6-(4-dimethylaminostyryl)-4H-pyran | 1.00 parts by mass |
| Methyl ethyl ketone (solvent) | 321.60 parts by mass |

Liquid Crystal Compound L-1

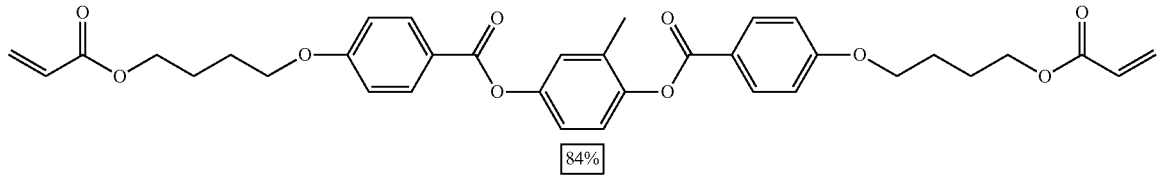

-continued

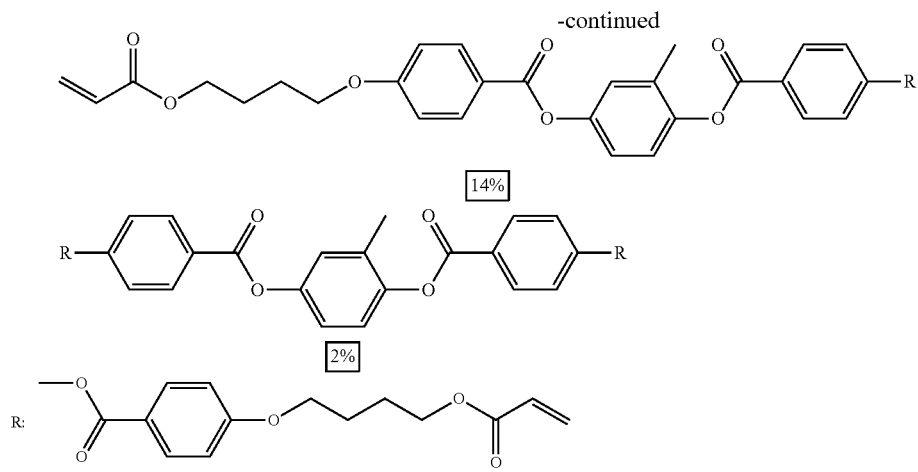

Polymerization Initiator 1-2

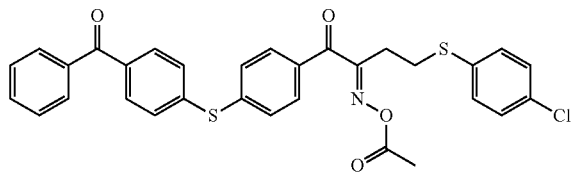 [SMILES: CC(=O)O/N=C(\CCSc1ccc(Cl)cc1)C(=O)c1ccc(Sc2ccc(C(=O)c3ccccc3)cc2)cc1]

Alignment Agent T-1

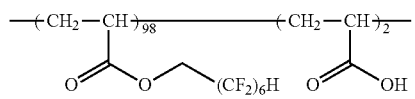

Chiral Agent Ch-1

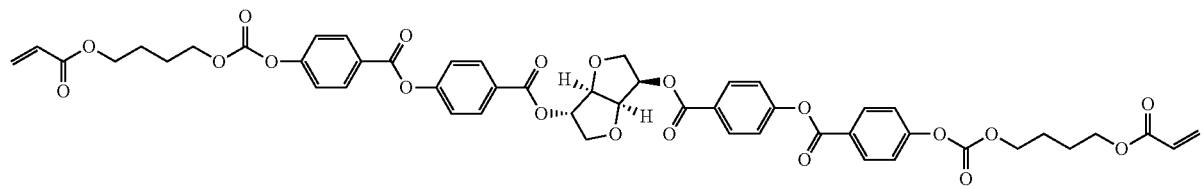 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Chiral Agent Ch-2

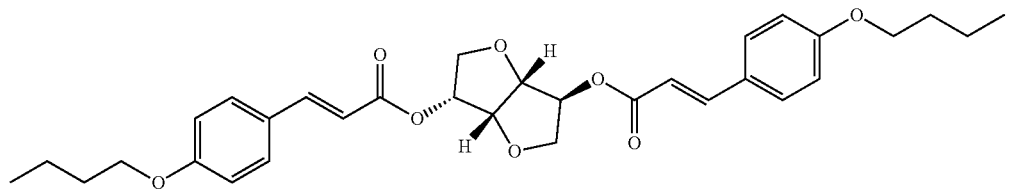 [SMILES: CCCCOc1ccc(/C=C/C(=O)O[C@H]2CO[C@H]3[C@@H]2OC[C@H]3OC(=O)/C=C/c2ccc(OCCCC)cc2)cc1]

<Measurement of Helical Twisting Power (HTP)>

The chiral agent Ch-2 was dissolved in ZLI-1132 (manufactured by Merck KGaA), and the initial HTP of the chiral agent Ch-2 was obtained with the Grandjean-Cano wedge method using a wedge cell. ZLI-1132 (manufactured by Merck KGaA) was used as a host liquid crystal during the measurement of the HTP of the chiral agent.

In addition, the same HTP measurement of the chiral agent Ch-2 was performed after causing a photoreaction to occur using an extra high pressure mercury lamp. In a case where the reaction (change in HTP) is in the steady state, the value was obtained as the HTP of the chiral agent Ch-2 after the photoreaction. These values were calculated based on "Molar Ratio chiral agent/ZLI-1132".

As a result, in the chiral agent Ch-2, the initial HTP was 54 $\mu m^{-1}$, and the HTP after the photoreaction was 8 $\mu m^{-1}$.

The above-described liquid crystal composition was applied to the alignment film using a spin coater at 800 rpm for 10 seconds (application step).

The coating film of the liquid crystal composition was heated on a hot plate at 80° C. for 3 minutes (180 sec) (heating step).

Next, the coating film was irradiated with ultraviolet light having a wavelength of 365 nm at 80° C. at an irradiation dose of 300 mJ/cm$^2$ using a high-pressure mercury lamp in a nitrogen atmosphere (curing step). As a result, the liquid crystal composition LC-1 was cured, the alignment of the liquid crystal compound was immobilized, and a cholesteric liquid crystal layer was formed.

Thus, a laser oscillation element including the support, the alignment film, and the cholesteric liquid crystal layer was prepared.

It was verified using a polarization microscope that the cholesteric liquid crystal layer had a periodically aligned surface as shown in FIG. 2.

The laser oscillation element was cut in a direction along the rotation direction of the optical axis to obtain a cross-sectional SEM image, and the cross-sectional SEM image was analyzed. As a result, the thickness d of the cholesteric liquid crystal layer was 2 μm, the single period Λ of the liquid crystal alignment pattern was 0.27 μm, the length pitch P of one helical pitch was 0.35 μm, and the tilt (tilt angle θ) of the bright portions and the dark portions with respect to the main surface was 41°.

Comparative Example 1

A laser oscillation element was prepared using the same method as that of Example 1 except that an alignment treatment of aligning the liquid crystal in the one in-plane direction by exposure to linearly polarized light of one laser beam instead of performing the laser interference exposure during the exposure of the alignment film and 0.08 parts by mass of the alignment agent T-2 was added instead of the alignment agent T-1 in the liquid crystal composition according to Example 1.

Alignment Agent T-2

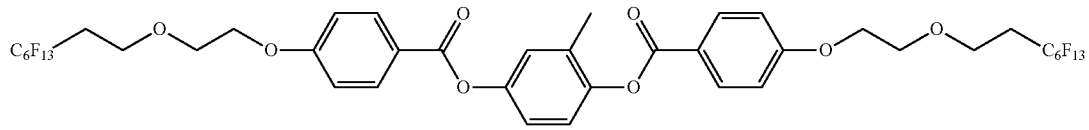

Example 2

During the exposure of the alignment film, an intersecting angle (intersecting angle α) between the two beams was adjusted to 112° such that the single period Λ (the length over which the optical axis rotates by 180°) of an alignment pattern formed by interference of two laser beams was 0.20 μm.

In addition, after applying the above-described liquid crystal composition to the alignment film and heating the liquid crystal composition, the liquid crystal composition was exposed using a high-pressure mercury lamp at 80° C. in the air atmosphere through a long pass filter of 300 nm and a short pass filter of 350 nm (first exposure step). The first exposure step was performed such that the light irradiation dose measured at a wavelength of 315 nm was 10 mJ/cm².

Next, the coating film was irradiated with ultraviolet light having a wavelength of 365 nm at 80° C. at an irradiation dose of 300 mJ/cm² using a high-pressure mercury lamp in a nitrogen atmosphere (curing step). As a result, the liquid crystal composition LC-1 was cured, the alignment of the liquid crystal compound was immobilized, and a cholesteric liquid crystal layer was formed.

Thus, a laser oscillation element including the support, the alignment film, and the cholesteric liquid crystal layer was prepared. A laser oscillation element was prepared using the same method as that of Example 1 except for the above-described configuration.

Regarding the prepared laser oscillation element according to Example 2, a cross-sectional SEM image was obtained and analyzed using the same method as that of Example 1. As a result, the thickness d of the cholesteric liquid crystal layer was 2 μm, the single period Λ of the liquid crystal alignment pattern was 0.20 μm, the length pitch P of one helical pitch was 0.40 μm, and the tilt (tilt angle θ) of the bright portions and the dark portions with respect to the main surface was 90°.

Regarding the prepared laser oscillation element according to Comparative Example 1, a cross-sectional SEM image was obtained and analyzed using the same method as that of Example 1. As a result, the thickness d of the cholesteric liquid crystal layer was 2 μm, the length pitch P of one helical pitch was 0.35 μm, and the tilt (tilt angle θ) of the bright portions and the dark portions with respect to the main surface was 0°.

[Verification of Laser Oscillation]

Using the laser oscillation element according to Example 1, an experiment for verifying laser oscillation was performed as follows.

Using a second harmonic (532 nm) of a nanosecond Q-switched laser (Surelite, manufactured by Continuum) as an excitation light source, linearly polarized light was converted into circularly polarized light by a quarter wavelength plate. Next, the converted light was focused using a lens having a focal length of 100 mm, and was emitted at 32 degrees with respect to a sample surface (the surface of the cholesteric liquid crystal layer). The light emitted from the sample was focused using a lens and was spectroscopically detected by a fiber-optic spectrophotometer. The pulse energy of the excitation light was measured using a pyroelectric energy sensor (ES111C, manufactured by Tholabs Inc.). The angle at which the emitted light was measured was 80° with respect to the sample surface.

Figure 10:
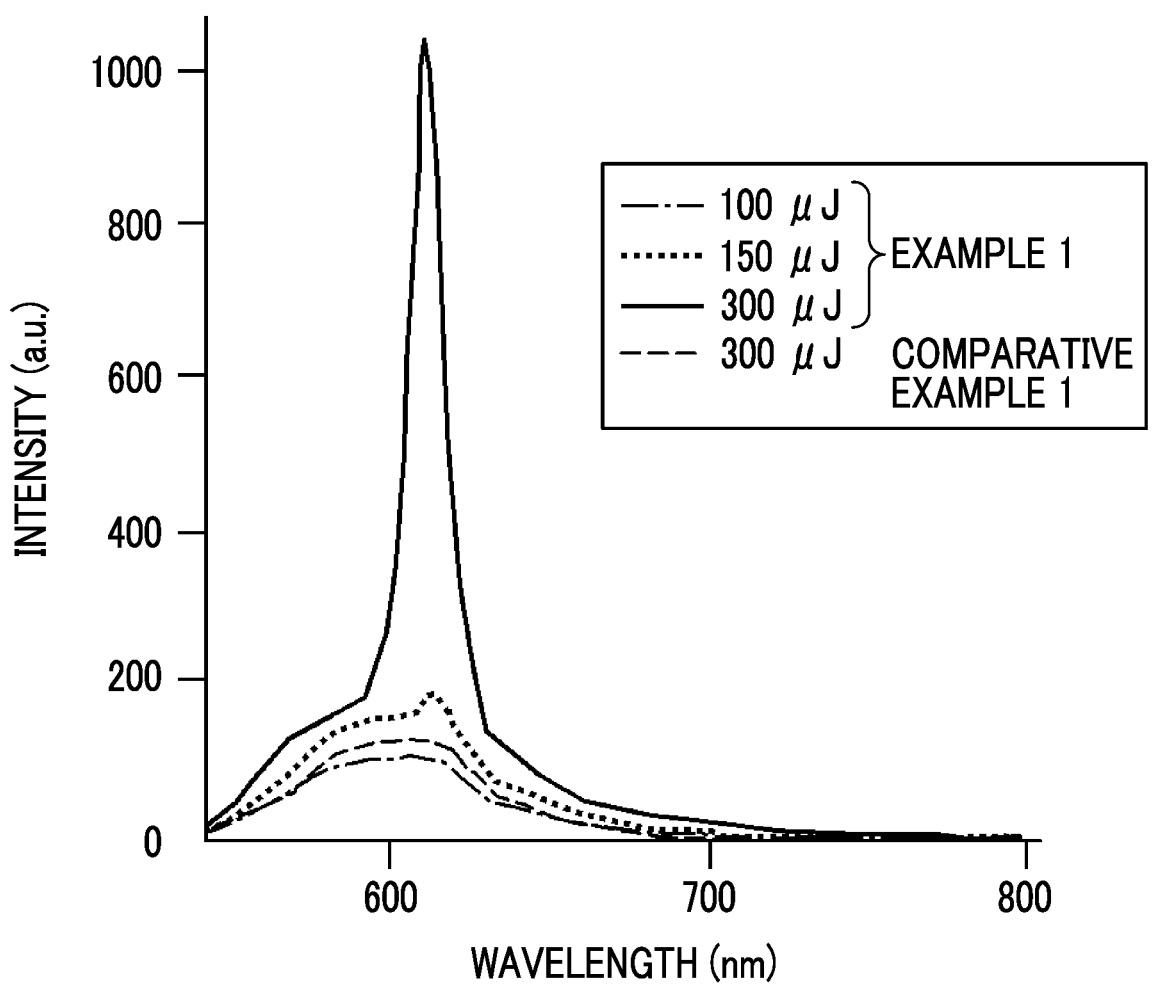
FIG. 10 is a graph showing a relationship between a wavelength and a luminescence intensity.

FIG. 10 is a graph showing the measurement of a relationship between a luminescence wavelength and an intensity.

As shown in FIG. 10, in a case where the intensity of the excitation light is 100 μJ or 150 μJ (0.3 J/cm²), emission in a wide wavelength range from 500 nm to 700 nm was observed. In a case where the intensity of the excitation light was increased up to 300 μJ, the peak intensity of the beam was increased by 5 times or more as compared to the intensity of fluorescence in a wide wavelength range. This way, a beam having a narrow width is emitted, and a clear excitation light energy threshold value was present for the emission of the light having a narrow width. Therefore, depending on the periodic structure of the cholesteric liquid crystalline phase, whether or not light emitted by inductive emission of the DCM colorant in the population inversion was amplified to induce laser oscillation was able to be verified.

Using the laser oscillation element according to Comparative Example 1, the same experiment for verifying laser oscillation as that of Example 1 was performed.

As shown in FIG. 10, the result in a case where the intensity of the excitation light was 300 μJ will be shown.

As in Example 1, emission in a wide wavelength range from 500 nm to 700 nm was observed. However, even in a case where the intensity of the excitation light was increased up to 300 μJ, a beam having a narrow width which was observed in Example 1 was not observed. Accordingly, it was found that laser oscillation was not induced in Comparative Example 1.

Figure 11:
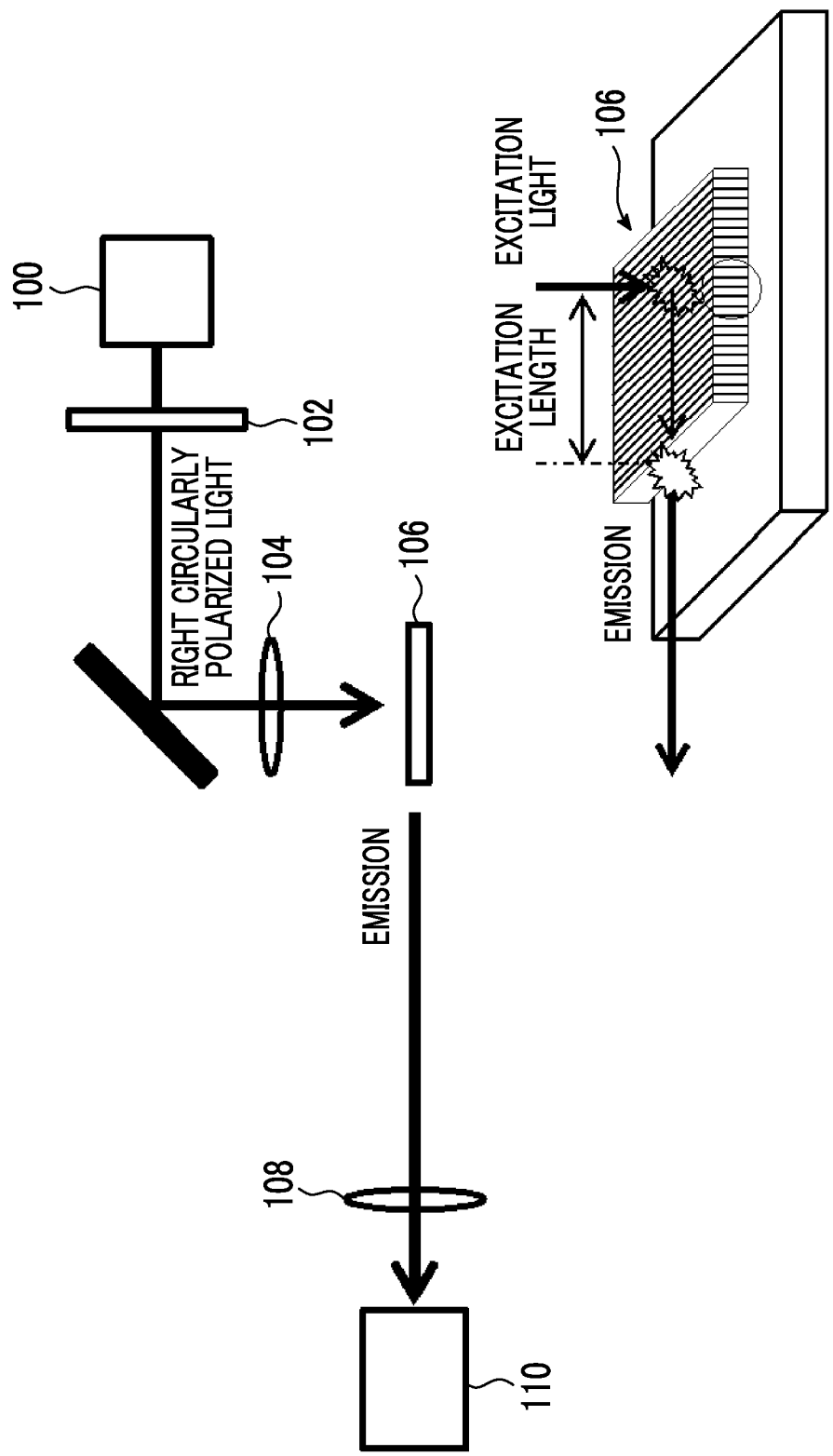
FIG. 11 is a diagram conceptually showing an optical system for a confirmatory experiment of laser oscillation in Examples.

Using the laser oscillation element according to Example 2 and the optical system shown in FIG. 11, an experiment for verifying laser oscillation was performed as follows.

Using a second harmonic (532 nm, 5-10 ns) of a nanosecond Q-switched laser (Surelite, manufactured by Continuum) as an excitation light source 100, linearly polarized light was converted into circularly polarized light by a quarter wavelength plate 102. Next, the converted light was focused using a lens 104 having a focal length of 300 mm, and was emitted perpendicular to a surface of a sample 106 (the surface of the cholesteric liquid crystal layer). The light emitted from the sample 106 was focused using a lens 108 and was spectroscopically detected by a fiber-optic spectrophotometer 110. The pulse energy of the excitation light was measured using a pyroelectric energy sensor (ES111C, manufactured by Tholabs Inc.). In addition, the laser oscillation element was used in a state where it was cut perpendicular to the in-plane rotation period of the alignment pattern such that the outside was peeled off. As a result, emission from an edge surface in a direction perpendicular to the sample surface was observed.

Figure 12:
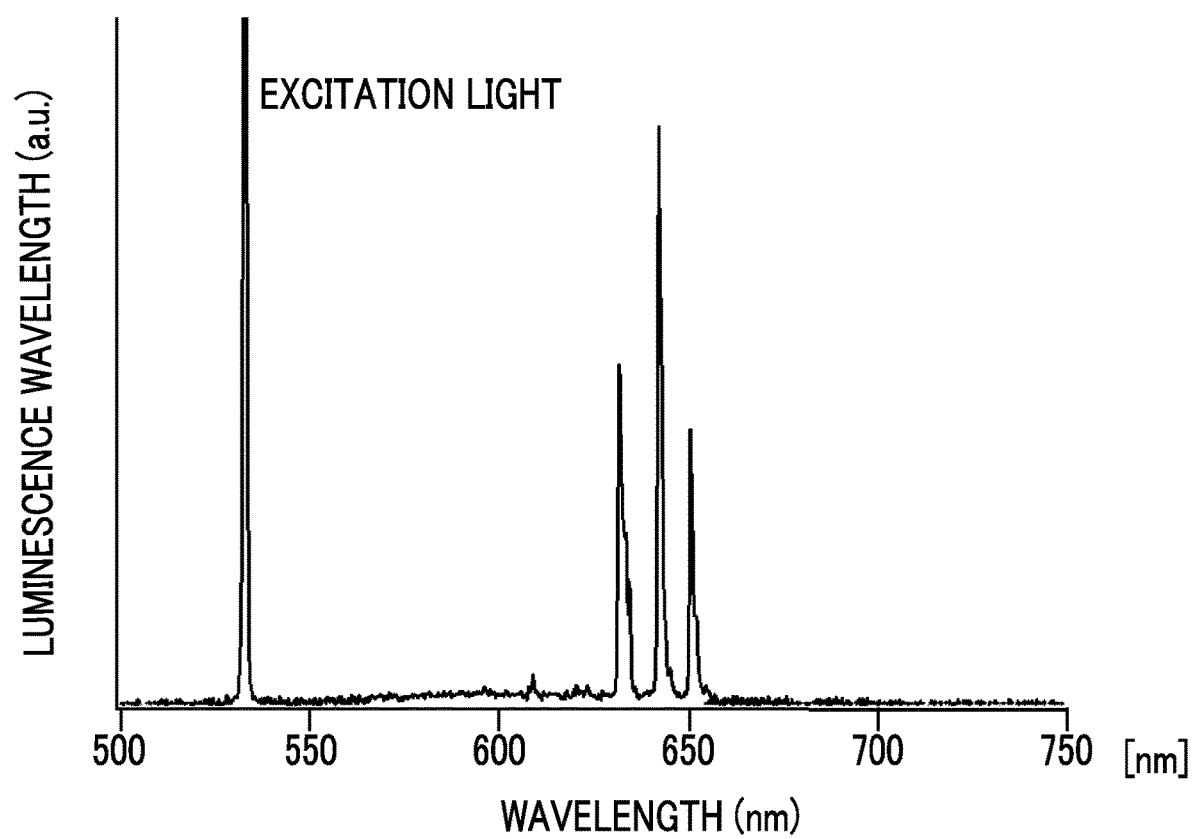
FIG. 12 is a graph showing a relationship between a luminescence wavelength and an intensity.
Figure 13:
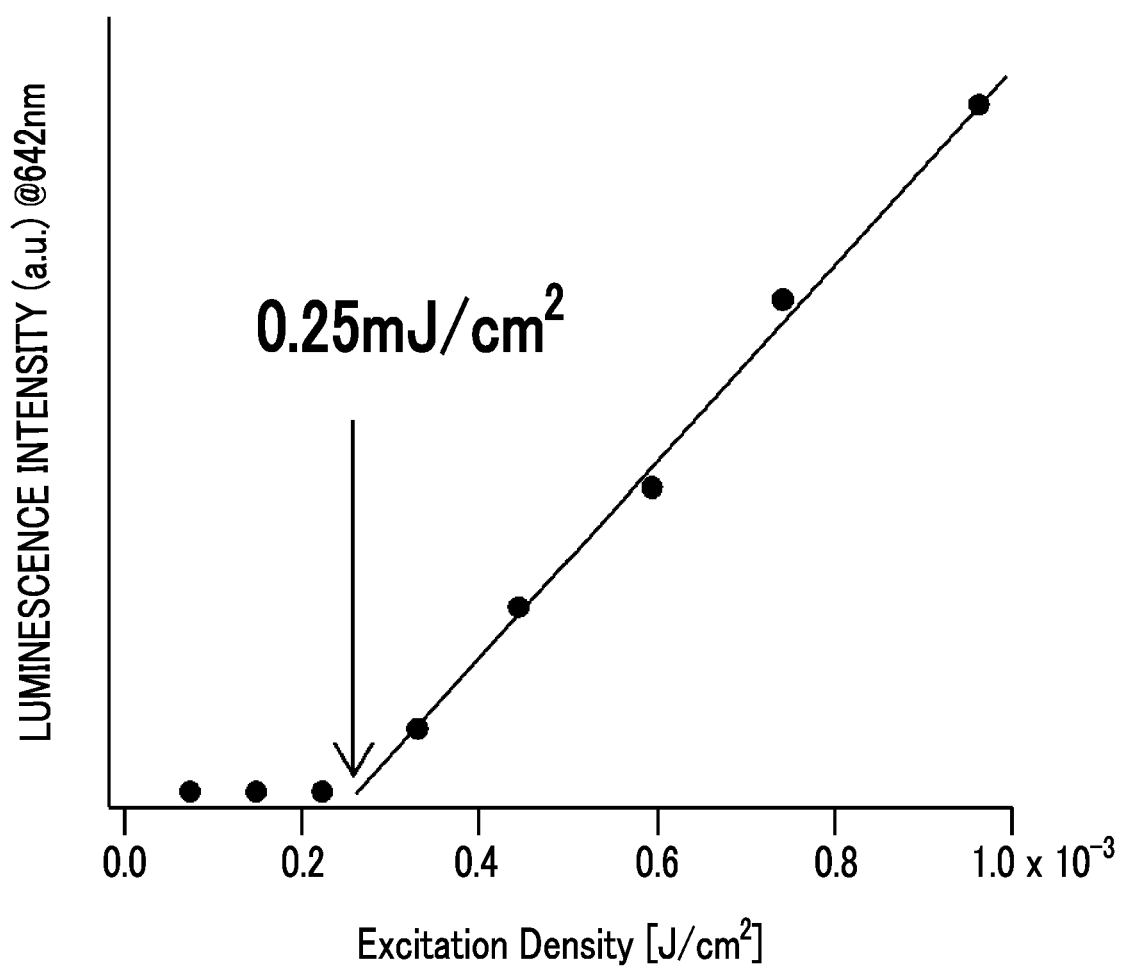
FIG. 13 is a graph showing an excitation light intensity dependence of a luminescence intensity.
Figure 14:
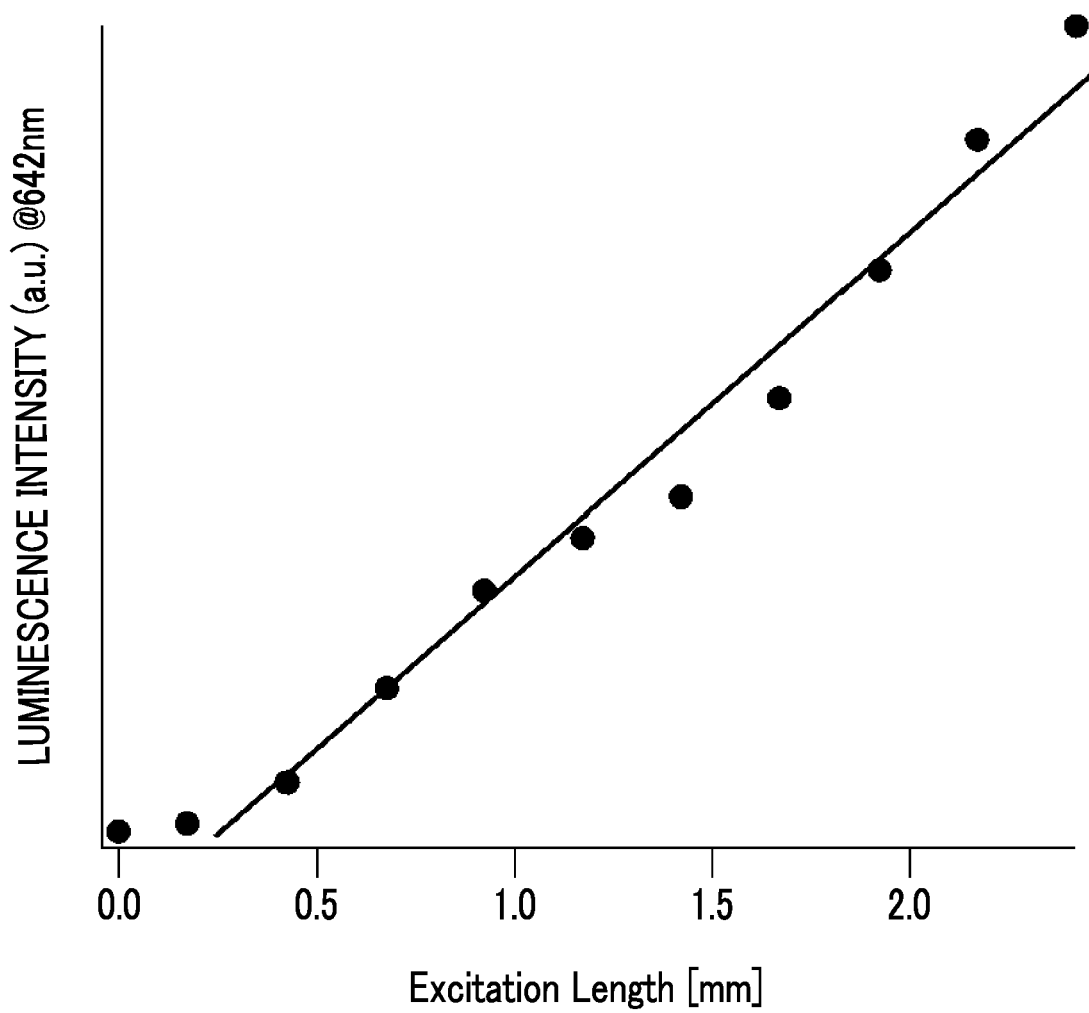
FIG. 14 is a graph showing an excitation length dependence of a luminescence intensity.

FIG. 12 is a graph showing the measurement of a relationship between a luminescence wavelength and an intensity in a case where light was emitted such that the irradiation diameter was 0.45 mm, the excitation length was 2 5 mm, and the excitation light intensity was 1.85 mJ. A plurality of sharp oscillation lines were observed around 642 nm, and the FWHM of the oscillation lines was 1.4 nm. In addition, FIG. 13 shows the excitation light intensity dependence of the luminescence intensity at an excitation length of 2.5 mm. The oscillation threshold value was about 0.25 mJ/cm$^2$. In addition, FIG. 14 shows the excitation length dependence of the luminescence intensity in a case where the irradiation diameter was 0.45 mm and the excitation light intensity was 7.4 mJ/cm$^2$. It was found that, as the excitation length increases, the excitation light intensity increases. This result shows that, in a case where the periodic surface of the cholesteric liquid crystal faces in the direction perpendicular to the sample surface, as the excitation length increases, the helical periodicity up to the light emitting portion increases, and the excitation light energy required for laser oscillation can be reduced.

As can be seen from the above results, the effects of the present invention are obvious.

The present invention can be suitably used as various laser light sources in optical communication and the like.

EXPLANATION OF REFERENCES

10: laser oscillation element
12: support
14: alignment film
16: cholesteric liquid crystal layer
40: liquid crystal compound
40A: optical axis
60: exposure device
62: laser
64: light source
65: λ/2 plate
68: polarization beam splitter
70a, 70B: mirror
72A, 72B: λ/4 plate
M: laser light
MA, MB: beam
$P_O$: linearly polarized light
$P_R$: right circularly polarized light
$P_L$: left circularly polarized light

What is claimed is:

1. A laser oscillation element comprising:
a cholesteric liquid crystal layer obtained by cholesteric alignment of a liquid crystal compound,
wherein in a cross-section of the cholesteric liquid crystal layer observed with a scanning electron microscope, bright portions and dark portions derived from a cholesteric liquid crystalline phase are tilted with respect to a main surface of the cholesteric liquid crystal layer,
a tilt angle of the bright portions and the dark portions with respect to the main surface of the cholesteric liquid crystal layer is 10° to 90° the cholesteric liquid crystal layer includes a colorant that emits light by excitation,
the cholesteric liquid crystal layer has a selective reflection wavelength range of a range of $\lambda_2$ to $\lambda_2$, and when the liquid crystal compound contained in the cholesteric liquid crystal layer has a refractive index in a major axis direction of ne and a refractive index in a minor axis direction of no, a helical pitch of the cholesteric liquid crystal layer is p, and two band edge wavelengths are $\lambda_1$=no×p and $\lambda_2$=ne×p, and
a luminescence wavelength range of the colorant and at least one of the band edge wavelengths of the cholesteric liquid crystal layer overlap each other.

2. The laser oscillation element according to claim 1, wherein a tilt angle of the bright portions and the dark portions with respect to the main surface of the cholesteric liquid crystal layer is 40° to 90°.

3. The laser oscillation element according to claim 1, wherein the colorant is an organic colorant.

4. The laser oscillation element according to claim 1, wherein the liquid crystal compound in the cholesteric liquid crystal layer is tilted with respect to the main surface of the cholesteric liquid crystal layer.

5. The laser oscillation element according to claim 3, wherein the colorant is an organic colorant.

6. The laser oscillation element according to claim 2, wherein the liquid crystal compound in the cholesteric liquid crystal layer is tilted with respect to the main surface of the cholesteric liquid crystal layer.

7. The laser oscillation element according to claim 3, wherein the liquid crystal compound in the cholesteric liquid crystal layer is tilted with respect to the main surface of the cholesteric liquid crystal layer.

* * * * *